(12) United States Patent
Yamashita et al.

(10) Patent No.: US 7,937,112 B2
(45) Date of Patent: May 3, 2011

(54) BASE STATION APPARATUS, COMMUNICATION METHOD, AND COMPUTER READABLE STORAGE MEDIUM STORING PROGRAM THEREOF

(75) Inventors: Kiyohide Yamashita, Fukuoka (JP); Yuji Nagano, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 674 days.

(21) Appl. No.: 12/048,522

(22) Filed: Mar. 14, 2008

(65) Prior Publication Data

US 2008/0234002 A1 Sep. 25, 2008

(30) Foreign Application Priority Data

Mar. 20, 2007 (JP) ................................. 2007-072204

(51) Int. Cl.
*H04B 1/38* (2006.01)
(52) U.S. Cl. ......... 455/561; 455/418; 455/440; 370/328
(58) Field of Classification Search .................. 455/418, 455/422.1, 436, 440, 550.1, 561; 370/328
See application file for complete search history.

(56) References Cited

U.S. PATENT DOCUMENTS

| 6,944,271 | B2 * | 9/2005 | Yakura et al. | 379/88.12 |
| 6,944,534 | B2 * | 9/2005 | Trautenberg | 701/200 |
| 7,116,646 | B1 * | 10/2006 | Gustafson et al. | 370/313 |
| 7,627,317 | B2 * | 12/2009 | Raji et al. | 455/436 |
| 7,689,212 | B2 * | 3/2010 | Lim | 455/425 |

FOREIGN PATENT DOCUMENTS

JP A 2002-271258 9/2002

\* cited by examiner

*Primary Examiner* — Nhan Le
(74) *Attorney, Agent, or Firm* — Greer, Burns & Crain, Ltd.

(57) ABSTRACT

The base station apparatus 10 stores apprise status data of certain data to each in-vehicle apparatus within a zone managed by the base station apparatus 10, transmits apprise status data stored in the status storage to other base station apparatuses, updates apprise status data stored in the status storage in accordance with a status of apprise to an in-vehicle apparatus within the zone managed by the base station apparatus 10 and/or apprise status data received from another base station apparatus, individually transmits unapprised data to an in-vehicle apparatus by referring to apprise status data stored in the status storage, requests distribution of the data to the center apparatus when the base station apparatus 10 has not received the data to be apprised, and upon receiving the data, transmits the data to an in-vehicle apparatus.

6 Claims, 18 Drawing Sheets

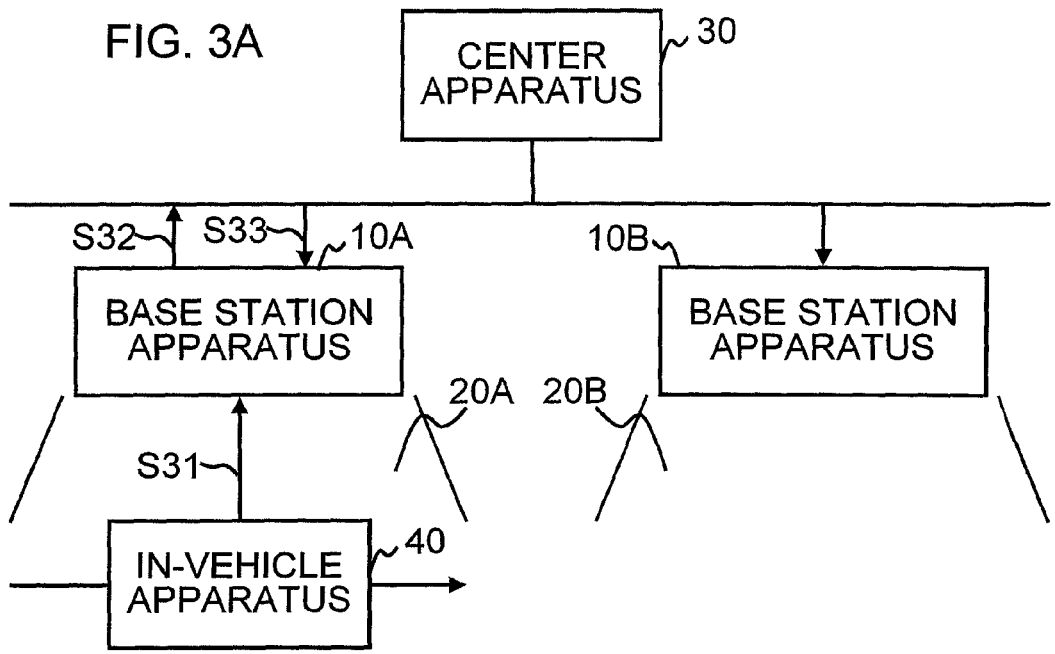
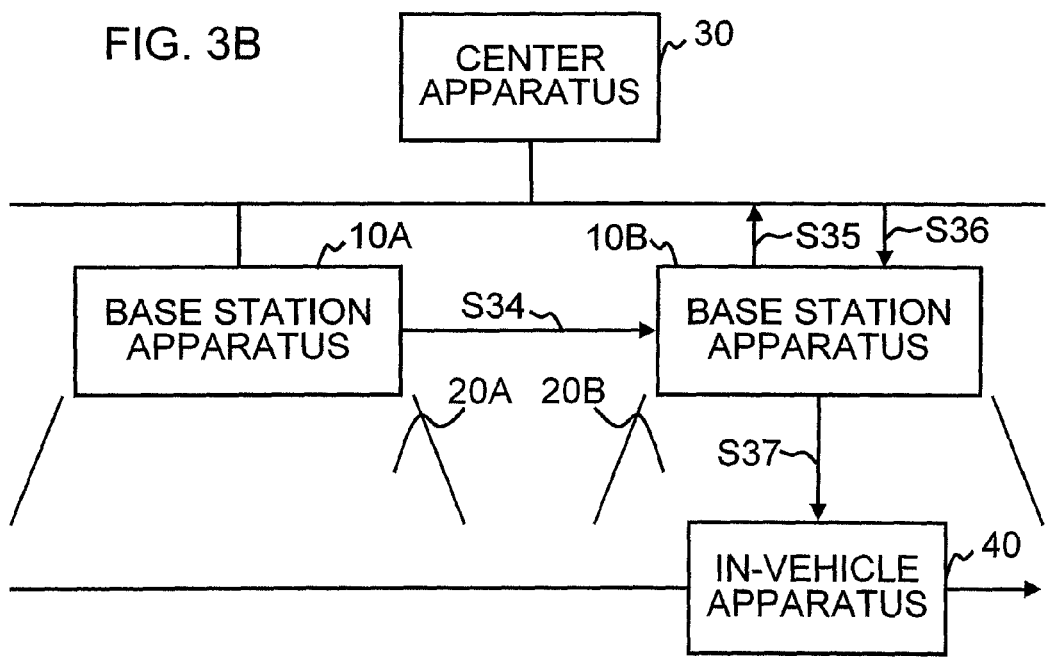

| APPARATUS TABLE | | | COMMON TABLE | | |
|---|---|---|---|---|---|
| ID | DATA TITLE | STATUS | ID | DATA TITLE | STATUS |
| | | | 01 | COMMON X | UNAPPRISED |
| | | | 02 | COMMON X | APPRISED |
| | | | 03 | COMMON X | APPRISED |
| | | | 04 | COMMON X | APPRISED |

FIG. 6A

| APPARATUS TABLE | | | COMMON TABLE | | |
|---|---|---|---|---|---|
| ID | DATA TITLE | STATUS | ID | DATA TITLE | STATUS |
| 01 | COMMON X | UNAPPRISED | 01 | COMMON X | UNAPPRISED |
| | | | 02 | COMMON X | APPRISED |
| | | | 03 | COMMON X | APPRISED |
| | | | 04 | COMMON X | APPRISED |

FIG. 6B

| APPARATUS TABLE | | | COMMON TABLE | | |
|---|---|---|---|---|---|
| ID | DATA TITLE | STATUS | ID | DATA TITLE | STATUS |
| | | | 02 | COMMON X | APPRISED |
| | | | 03 | COMMON X | APPRISED |
| | | | 04 | COMMON X | APPRISED |

FIG. 6C

| APPARATUS TABLE | | | COMMON TABLE | | |
|---|---|---|---|---|---|
| ID | DATA TITLE | STATUS | ID | DATA TITLE | STATUS |
| 01 | | | 01 | | |
| | | | 02 | COMMON X | APPRISED |
| | | | 03 | COMMON X | APPRISED |
| | | | 04 | COMMON X | APPRISED |

FIG. 6D

| APPARATUS TABLE | | | COMMON TABLE | | |
|---|---|---|---|---|---|
| ID | DATA TITLE | STATUS | ID | DATA TITLE | STATUS |
| 01 | COMMON X | UNAPPRISED | 01 | COMMON X | UNAPPRISED |
| | | | 02 | COMMON X | APPRISED |
| | | | 03 | COMMON X | APPRISED |
| | | | 04 | COMMON X | APPRISED |

| APPARATUS TABLE | | | COMMON TABLE | | |
| --- | --- | --- | --- | --- | --- |
| ID | DATA TITLE | STATUS | ID | DATA TITLE | STATUS |
| 01 | | | 01 | | |
| | | | 02 | | |
| | | | 03 | | |
| | | | 04 | | |

FIG. 8B

| APPARATUS TABLE | | | COMMON TABLE | | |
| --- | --- | --- | --- | --- | --- |
| ID | DATA TITLE | STATUS | ID | DATA TITLE | STATUS |
| 01 | COMMON X | UNAPPRISED | 01 | COMMON X | UNAPPRISED |
| | | | 02 | | |
| | | | 03 | | |
| | | | 04 | | |

FIG. 10A

| 01 | COMMON X | APPRISED |

FIG. 10B

| APPARATUS TABLE ||| COMMON TABLE |||
| ID | DATA TITLE | STATUS | ID | DATA TITLE | STATUS |
|---|---|---|---|---|---|
| 01 | COMMON X | UNAPPRISED | 01 | COMMON X | UNAPPRISED |
| | | | 02 | COMMON X | APPRISED |
| | | | 03 | COMMON X | APPRISED |
| | | | 04 | COMMON X | APPRISED |

FIG. 10C

| APPARATUS TABLE ||| COMMON TABLE |||
| ID | DATA TITLE | STATUS | ID | DATA TITLE | STATUS |
|---|---|---|---|---|---|
| 01 | COMMON X | UNAPPRISED | 01 | COMMON X | APPRISED |
| | | | 02 | COMMON X | APPRISED |
| | | | 03 | COMMON X | APPRISED |
| | | | 04 | COMMON X | APPRISED |

FIG. 10D

| APPARATUS TABLE ||| COMMON TABLE |||
| ID | DATA TITLE | STATUS | ID | DATA TITLE | STATUS |
|---|---|---|---|---|---|
| | | | 01 | COMMON X | APPRISED |
| | | | 02 | COMMON X | APPRISED |
| | | | 03 | COMMON X | APPRISED |
| | | | 04 | COMMON X | APPRISED |

| APPARATUS TABLE | | | COMMON TABLE | | |
|---|---|---|---|---|---|
| ID | DATA TITLE | STATUS | ID | DATA TITLE | STATUS |
| 01 | COMMON X | APPRISED | 01 | COMMON X | APPRISED |
| | | | 02 | COMMON X | APPRISED |
| | | | 03 | COMMON X | APPRISED |
| | | | 04 | COMMON X | APPRISED |

FIG. 12A

| APPARATUS TABLE | | | COMMON TABLE | | |
|---|---|---|---|---|---|
| ID | DATA TITLE | STATUS | ID | DATA TITLE | STATUS |
| 01 | COMMON X | APPRISED | 01 | COMMON X | APPRISED |
| | DEMANDED Y | UNAPPRISED | | DEMANDED Y | UNAPPRISED |
| | | | 02 | COMMON X | APPRISED |
| | | | 03 | COMMON X | APPRISED |
| | | | 04 | COMMON X | APPRISED |

FIG. 12B

| APPARATUS TABLE | | | COMMON TABLE | | |
|---|---|---|---|---|---|
| ID | DATA TITLE | STATUS | ID | DATA TITLE | STATUS |
| 01 | COMMON X | UNAPPRISED | 01 | COMMON X | UNAPPRISED |
| | | | 02 | COMMON X | APPRISED |
| | | | 03 | COMMON X | APPRISED |
| | | | 04 | COMMON X | APPRISED |

FIG. 14A

| APPARATUS TABLE | | | COMMON TABLE | | |
|---|---|---|---|---|---|
| ID | DATA TITLE | STATUS | ID | DATA TITLE | STATUS |
| 01 | COMMON X | APPRISED | 01 | COMMON X | APPRISED |
| | | | 02 | COMMON X | APPRISED |
| | | | 03 | COMMON X | APPRISED |
| | | | 04 | COMMON X | APPRISED |

FIG. 14B

| APPARATUS TABLE | | | COMMON TABLE | | |
|---|---|---|---|---|---|
| ID | DATA TITLE | STATUS | ID | DATA TITLE | STATUS |
| 01 | COMMON X | NG | 01 | COMMON X | UNAPPRISED |
| | | | 02 | COMMON X | APPRISED |
| | | | 03 | COMMON X | APPRISED |
| | | | 04 | COMMON X | APPRISED |

FIG. 14C

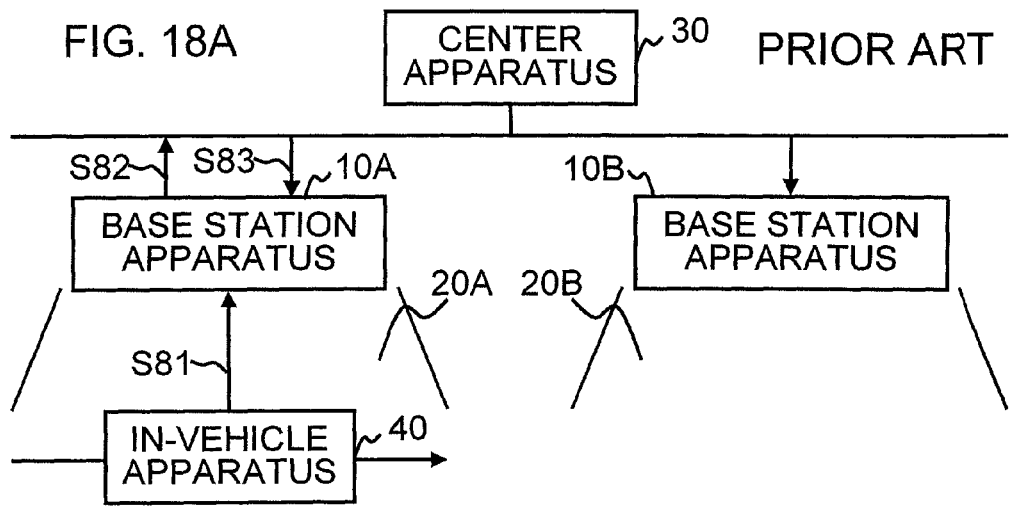
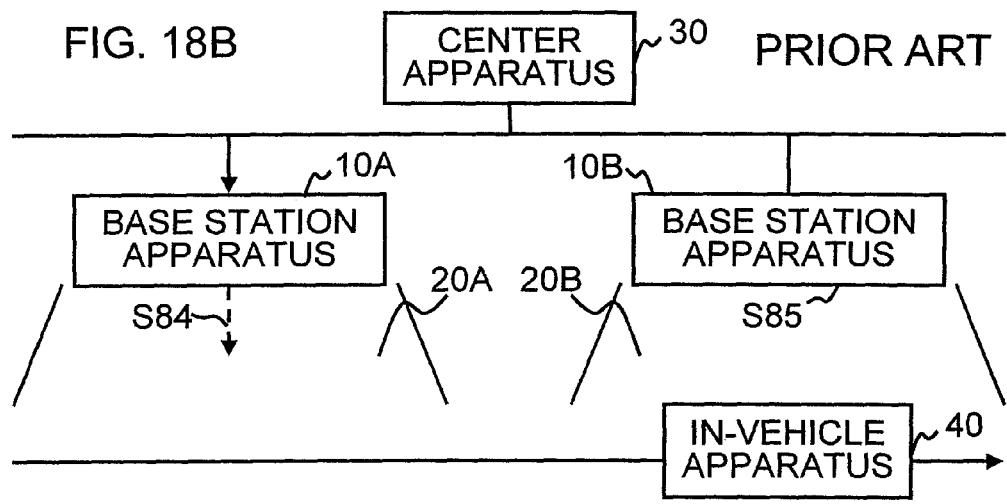
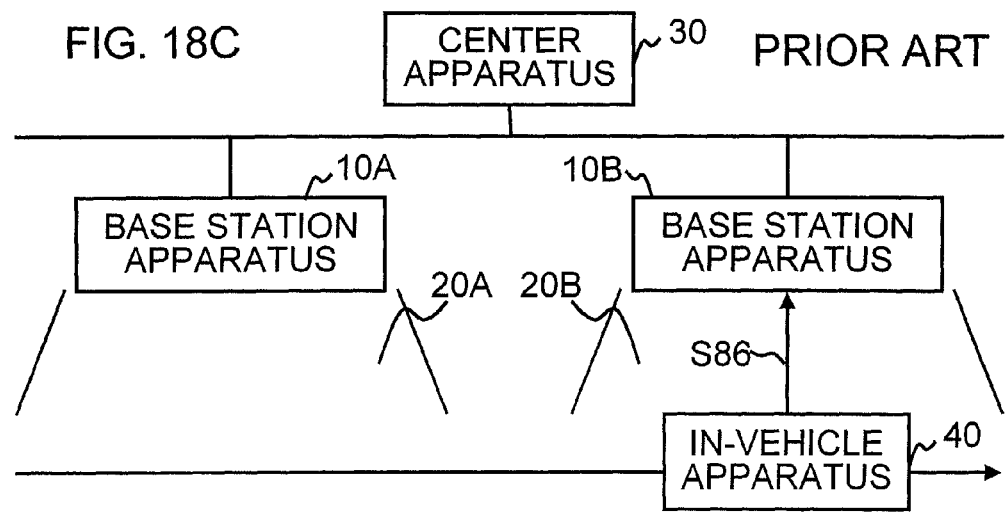

BASE STATION APPARATUS, COMMUNICATION METHOD, AND COMPUTER READABLE STORAGE MEDIUM STORING PROGRAM THEREOF

BACKGROUND OF THE INVENTION

1. Field of the Invention

The present invention relates to a base station apparatus, and in particular, to a base station apparatus capable of cooperating with another base station apparatus.

2. Description of the Related Art

Conventionally, there are communication systems, such as ETC (Electronic Toll Collection System) and a cellular system of a mobile phone, in which a plurality of base station apparatuses, each managing a predetermined zone, disposed at regular interval of distance perform narrowband communications using a DSRC (Dedicated Short Range Communication) method with a wireless communication apparatus that moves from zone to zone.

For example, Japanese Laid-open Patent Publication No. 2002-271258 discloses a communication system in which a base station apparatus performs wireless communications with a vehicle having a wireless communication apparatus (in-vehicle apparatus). Specifically, in the disclosed communication system, a plurality of base station apparatuses each managing a predetermined zone are disposed at regular interval of distance, a vehicle moves from zone to zone, and a center apparatus gives instructions of data transmission or the like to the plurality of base station apparatuses. The data is transmitted from the center apparatus to the vehicles via the base station apparatuses.

For example, data such as data on a traffic accident or guide data of service areas is transferred to a vehicle moving on a highway via the base station apparatuses disposed every highway interchange or every 100 meters on road shoulders of the highway.

The above-mentioned conventional art has a problem that communications between the base station apparatus and the in-vehicle apparatus are not performed reliably and smoothly without iteration.

FIGS. 16A to 18C are diagrams for illustrating a base station apparatus according to a conventional art. Examples will be described with reference to FIGS. 16A to 18C. A base station apparatus 10A according to the conventional art receives from a center apparatus 30, through a wired system, common data (e.g., data on a traffic accident) which is data to be transmitted to all in-vehicle apparatuses in a certain area. The base station apparatus 10A transmits the common data to the in-vehicle apparatuses in all vehicles indiscriminatingly within a zone managed by the base station apparatus 10A, that is, where wireless communications with the base station apparatus 10A can be performed, through wireless communication via radio waves or the like. In this case, the base station apparatus 10A does not receive responses to the common data from the in-vehicle apparatuses and does not detect statuses of apprise of the common data to the in-vehicle apparatuses (hereinafter, such an indiscriminating transmission of data from the base station apparatus is referred to as "broadcast apprise").

Upon receiving a signal indicating a demand for certain data, the base station apparatus 10A according to the conventional art requests, to the center apparatus 30, the demanded data (e.g., data on a service area) to be provided in response to the signal. Upon receiving the demanded data, the base station apparatus specifies a pertinent in-vehicle apparatus, and transmits the demanded data to the specified in-vehicle apparatus individually. In this case, the base station apparatus receives a response to the demanded data from the in-vehicle apparatus, thereby detecting the status of apprise of the demanded data to the in-vehicle apparatus (hereinafter, such an individual transmission of demanded data to a specified in-vehicle apparatus from the base station apparatus is referred to as "individual apprise").

On this assumption, when common data is distributed from the center apparatus to a plurality of base station apparatuses and broadcast apprised from the plurality of base station apparatuses, the base station apparatus according to the conventional art iteratively transmits the common data to the same in-vehicle apparatus. For example, as shown in FIGS. 16A and 16B, when data titled "COMMON X" is broadcast apprised from a plurality of base station apparatuses, the base station apparatuses (e.g., base station apparatus 10A and base station apparatus 10B) receive the data titled "COMMON X" from the center apparatus 30 (step S61). The base station apparatus 10A performs the broadcast apprise of the data titled "COMMON X" to in-vehicle apparatuses (e.g., in-vehicle apparatus 40) within a zone 20A managed by the base station apparatus 10A (step S62). Thereafter, a vehicle having the in-vehicle apparatus 40 moves to a zone 20B managed by the base station apparatus 10B. The base station apparatus 10B does not detect the status of apprise of the common data to the in-vehicle apparatus 40, and performs the broadcast apprise of the data titled "COMMON X" to the in-vehicle apparatuses (e.g., in-vehicle apparatus 40) within a zone 20B, similarly to the base station apparatus 10A (step S63). That is, the in-vehicle apparatus 40 iteratively receives the data titled "COMMON X".

When common data is distributed to a specific base station apparatus from the center apparatus and broadcast apprised from the specific base station apparatus, the base station apparatus according to the conventional art does not reliably transmit the common data to in-vehicle apparatuses. For example, as shown in FIGS. 17A and 17B, when data titled "COMMON X" is broadcast apprised only from a specific base station apparatus (e.g., base station apparatus 10A), the base station apparatus 10A receives the data titled "COMMON X" from the center apparatus 30 (step S71), and performs the broadcast apprise of the data titled "COMMON X" to in-vehicle apparatuses (e.g., in-vehicle apparatus 40) within a zone 20A managed by the base station apparatus 10A (step S72). Herein, suppose that the in-vehicle apparatus 40 does not receive the data titled "COMMON X" from the base station apparatus 10A due to a radio disturbance or the like (step S73). Thereafter, a vehicle having the in-vehicle apparatus 40 moves to a zone 20B managed by the base station apparatus 10B. The base station apparatus 10A performs the broadcast apprise of the data titled "COMMON X" but the in-vehicle apparatus 40 is not within the zone 20A (step S74). The base station apparatus 10B does not receive the data titled "COMMON X" and does not perform the broadcast apprise of the data titled "COMMON X" (step S75). That is, the in-vehicle apparatus 40 cannot receive reliably the data titled "COMMON X" which should be received.

When demanded data is individually apprised, the base station apparatuses according to the conventional art individually receive a signal indicating a demand for data. Specifically, as shown in FIGS. 18A to 18C, a base station apparatus 10A receives a signal indicating a demand for data titled "DEMANDED Y" from an in-vehicle apparatus 40 (step S81). Then, the base station apparatus 10A requests the data to the center apparatus 30 (step S82), and only the base station apparatus 10A receives the data (step S83). If the in-vehicle apparatus 40 moves to a zone 20B from a zone 20A during this, the in-vehicle apparatus 40 is not within the zone 20A when the base station apparatus 10A attempts to transmit the data (step S84). The base station apparatus 10B does not receive the data titled "DEMANDED Y" and does not transmit the data (step S85). That is, the in-vehicle apparatus 40 cannot receive the data titled "DEMANDED Y". Then, the in-vehicle apparatus 40 transmits again the signal indicating a demand for data titled "DEMANDED Y" and the base station apparatus 10B receives the signal (step S86). That is, the in-vehicle apparatus 40 iteratively transmits the same signal indicating the demand for data titled "DEMANDED Y" to the base station apparatus 10A and the base station apparatus 10B.

As mentioned above, the conventional art has a problem that the communications between the base station apparatus and the in-vehicle apparatus are not performed reliably and smoothly without iteration. In other words, the in-vehicle apparatus iteratively receives data that has been already received, does not reliably receive data, or iteratively demands for data.

SUMMARY

The present invention is devised to solve the problem of the conventional art. It is an object of the present invention to provide a base station apparatus with can perform communications reliably and smoothly without iteration.

According to a first aspect of the present invention, there is provided a base station apparatus which transmits center data which is received from a center apparatus to wireless communication apparatuses within a zone, wherein the base station apparatus is capable of communicating with other base station apparatuses. The base station apparatus includes: a data storage which stores the center data which is received from the center apparatus, a data receiver which receives the center data from the center apparatus and stores the center data in the data storage, a status storage which stores apprise status data which is indicative of a status of apprise of certain center data to a wireless communication apparatus, a status receiver which receives apprise status data which is transmitted from one of the other base station apparatuses, an updater which updates the apprise status data which is stored in the status storage in accordance with the apprise status data which is received from the one of the other base station apparatuses, and an individual transmitter which transmits by referring to the apprise status data which is stored in the status storage the certain center data which is stored in the data storage to a wireless communication apparatus within the zone and unapprised of the certain center data.

The base station apparatus may further include a status transmitter which transmits the apprise status data which is stored in the status storage to the other base station apparatuses, and when the status of apprise has been changed by transmission of the certain center data to a wireless communication apparatus within the zone, the updater may update the apprise status data which is stored in the status storage and the status transmitter may transmit the updated apprise status data to the other base station apparatuses.

The individual transmitter of the base station apparatus preferably requests, in the absence of the certain center data, the center apparatus for the certain center data, and transmits, on receiving the certain center data, the certain center data to the wireless communication apparatus which is within the zone and unapprised of the certain center data.

The individual transmitter of the base station apparatus preferably transmits the certain center data to the wireless communication apparatus which is within the zone and unapprised of the certain center data when the base station apparatus has determined that the certain center data is still needed.

According to a second aspect of the present invention, there is provided a communication method executed by a base station apparatus which transmits center data which is received from a center apparatus to wireless communication apparatuses within a zone, wherein the base station apparatus is capable of communicating with other base station apparatuses. The base station apparatus includes a data storage which stores the center data which is received from the center apparatus and a status storage which stores apprise status data which is indicative of a status of apprise of certain center data to a wireless communication apparatus. The communication method includes the steps of: receiving the center data from the center apparatus and storing the center data in the data storage, receiving apprise status data which is transmitted from one of the other base station apparatuses, updating the apprise status data which is stored in the status storage in accordance with the apprise status data which is received from the one of the other base station apparatuses, and transmitting by referring to the apprise status data which is stored in the status storage the certain center data which is stored in the data storage to a wireless communication apparatus within the zone and unapprised of the certain center data.

According to a third aspect of the present invention, there is provided a computer readable storage medium which stores a program of instructions to a computer for executing a communication method for transmitting center data which is received from a center apparatus to wireless communication apparatuses, wherein the computer is capable of communicating with base station apparatuses. The computer includes a data storage which stores the center data which is received from the center apparatus and a status storage which stores an apprise status of certain center data to a wireless communication apparatus, wherein the apprise status is data which indicates a status of apprise of the certain center data. The communication method includes the steps of: receiving the center data from the center apparatus and storing the center data in the data storage, receiving an apprise status which is transmitted from one of the base station apparatuses, updating the apprise status which is stored in the status storage in accordance with a status of apprise of the certain center data to a wireless communication apparatus within a zone where wireless communications with the computer can be performed and the apprise status which is received from the one of the base station apparatuses, and transmitting by referring to the apprise status which is stored in the status storage the certain center data which is stored in the data storage to a wireless communication apparatus which is within the zone and unapprised of the certain center data.

According to a third aspect of the present invention, there is provided a computer readable storage medium storing a program of instructions to a computer for executing a communication method for transmitting center data which is received from a center apparatus to wireless communication apparatuses within a zone, wherein the computer is capable of communicating with base station apparatuses. The computer includes a data storage which stores the center data which is received from the center apparatus and a status storage which stores apprise status data which is indicative of a status of apprise of certain center data to a wireless communication apparatus. The communication method includes the steps of: receiving the center data from the center apparatus and storing the center data in the data storage, receiving apprise status data which is transmitted from one of the base station apparatuses, updating the apprise status data which is stored in the status storage in accordance with the apprise status data which is received from the one of the base station apparatuses, and transmitting by referring to the apprise status data which is stored in the status storage the certain center data which is stored in the data storage to a wireless communication apparatus within the zone and unapprised of the certain center data.

BRIEF DESCRIPTION OF THE DRAWINGS

FIGS. 1A, 1B, 2A, 2B, 3A, and 3B are diagrams for illustrating an outline and features of a base station apparatus according to a first embodiment of the present invention;

FIGS. 6A to 6E are diagrams for illustrating processing of a status updater of the base station apparatus according to the first embodiment of the present invention when the in-vehicle apparatus enters the zone managed by the base station apparatus;

FIGS. 8A and 8B are diagrams for illustrating processing of the status updater of the base station apparatus according to the first embodiment of the present invention upon receiving the common data;

FIGS. 10A to 10D are diagrams for illustrating processing of the status updater of the base station apparatus according to the first embodiment of the present invention upon receiving the update data of the status storage;

FIGS. 12A and 12B are diagrams for illustrating processing of the status updater of the base station apparatus according to the first embodiment of the present invention upon receiving the demand for data;

FIGS. 14A to 14C are diagrams for illustrating processing of the status updater of the base station apparatus according to the first embodiment of the present invention in individual apprise;

FIGS. 16A, 16B, 17A, 17B, and 18A to 18C are diagrams for illustrating a base station apparatus according to a conventional art.

DESCRIPTION OF THE PREFERRED EMBODIMENTS

Figure 1A:
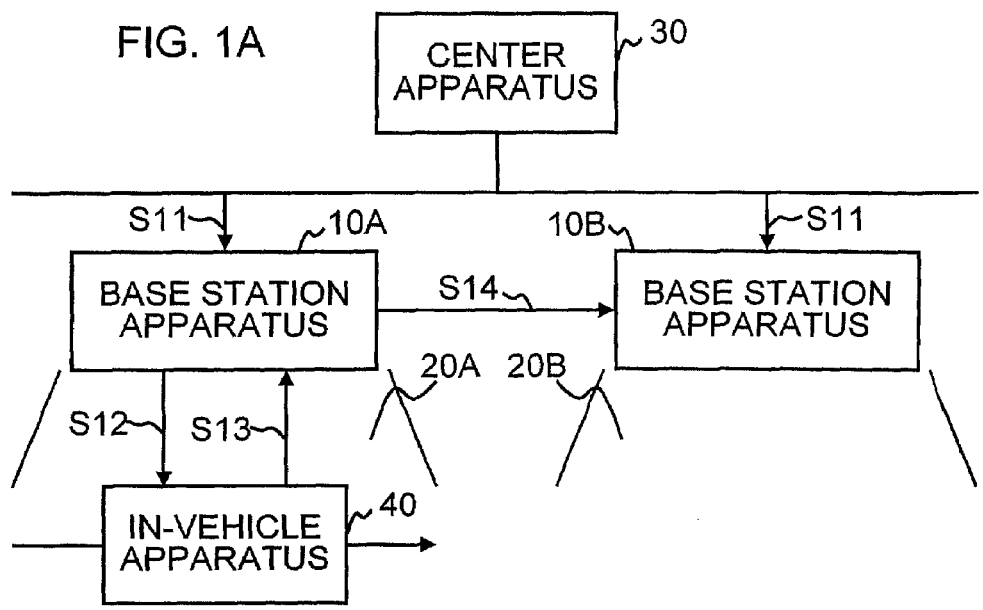

Hereinafter, a specific description will be given on a base station apparatus according to embodiments of the present invention with reference to the accompanying drawings. The description will be given on the case where a base station apparatus (installed at an ETC gate or in a radio station on a road shoulder of a highway) transmits data to an in-vehicle apparatus which is a wireless communication apparatus mounted on a vehicle.

First Embodiment

Hereinafter, a description will be sequentially given on main terms used in the description of a first embodiment of the present invention, an outline and features of a base station apparatus according to the first embodiment, a configuration of the base station apparatus, processing flow of the base station apparatus, and advantages of the first embodiment.

First of all, main terms used in the description of the first embodiment of the present invention will be described. "Common data" is data that is transmitted to all in-vehicle apparatuses in a certain area. Specifically, the "common data" is distributed to all or a part of base station apparatuses from a center apparatus, and is transmitted to all in-vehicle apparatuses in zones managed by the base station apparatuses. For example, data on a traffic accident or a traffic jam on a highway may correspond to the "common data".

"Demanded data" is data individually demanded from an in-vehicle apparatus. Specifically, when an in-vehicle apparatus transmits a signal indicating a demand for data to a base station apparatus, the base station apparatus requests the data to the center apparatus in response to the signal. Upon receiving the data from the center apparatus, the base station apparatus transmits the data to a pertinent in-vehicle apparatus within a zone thereof. For example, data on a service area on a highway or local data may correspond to the "demanded data".

"Individual apprise" is a communication in which a base station apparatus specifies an in-vehicle apparatus and transmits data on the specified in-vehicle apparatus. Specifically, a base station apparatus individually transmits data received from the center apparatus to an in-vehicle apparatus on the basis of the status of apprise and receives a response, from the in-vehicle apparatus, indicating that the data is received. For example, the communication for individually transmitting data on a traffic accident or a service area to a pertinent in-vehicle apparatus may correspond to the "individual apprise".

FIGS. 1A to 3B are diagrams for illustrating an outline and features of a base station apparatus according to a first embodiment of the present invention. A description will be given on the outline and features of the base station apparatus according to the first embodiment of the present invention with reference to FIGS. 1A to 3B.

As shown in FIGS. 1A to 3B, the outline is that a base station apparatus according to the first embodiment of the present invention transfers data from a center apparatus to an in-vehicle apparatus through wired communication with the center apparatus and through wireless communication via radio waves or the like with the in-vehicle apparatus within a zone managed by the base station apparatus. A main feature is that the data is reliably and smoothly apprised to the in-vehicle apparatus without iteration.

The main feature will be described. A base station apparatus according to the first embodiment of the present invention stores data (referred to as "apprise status dataes") indicating statuses of apprise, that is, whether certain data has been apprised to every in-vehicle apparatuses within a zone managed by the base station apparatus and other zones managed by other base station apparatuses. Specifically, a base station apparatus 10A stores, to a status storage, an entry in which a data title (e.g., "COMMON X") for identifying data to be transmitted and apprise status data (e.g., "UNAPPRISED") of the data are associated with an ID (identifier, e.g., "01") of an in-vehicle apparatus 40 within a zone managed by the base station apparatus 10A (e.g., refer to FIGS. 6A to 6E).

A base station apparatus according to the first embodiment of the present invention transmits apprise status data stored in a status storage to other base station apparatuses. Specifically, a base station apparatus 10A transmits, to the other base station apparatus, ID (e.g., "01") of an in-vehicle apparatus within a zone managed by the base station apparatus 10A, a data title (e.g., "COMMON X") of data to be apprised, and apprise status data (e.g., "UNAPPRISED") of the data stored in the status storage.

A base station apparatus according to the first embodiment of the present invention updates apprise status data stored in a status storage in accordance with a status of apprise to an in-vehicle apparatus within a zone managed by the base station apparatus and/or apprise status data received from another base station apparatus. For example, a base station apparatus 10A transmits data titled "COMMON X" to an in-vehicle apparatus 40 within a zone managed by the base station apparatus 10A, and upon receiving a response to the data from the in-vehicle apparatus 40, the base station apparatus 10A updates apprise status data in an entry including "01" and "COMMON X" stored in a status storage from "UNAPPRISED" to "APPRISED". Moreover, upon receiving from another base station apparatus a signal for updating an entry including "01" and "COMMON X" from "UNAPPRISED" to "APPRISED", the base station apparatus 10A updates the entry including "01" and "COMMON X" in the status storage from "UNAPPRISED" to "APPRISED".

A base station apparatus according to the first embodiment of the present invention individually transmits unapprised data to an in-vehicle apparatus within a zone managed by the base station apparatus by referring to apprise status data stored in a status storage. Specifically, a base station apparatus 10A refers to an entry including "UNAPPRISED" as apprise status data in a status storage and individually transmits pertinent data to a corresponding in-vehicle apparatus (e.g., an in-vehicle apparatus 40). For example, when data titled "COMMON X" is unapprised to the in-vehicle apparatus 40, upon finding "UNAPPRISED" in an entry including "01" and the "COMMON X" in the status storage, the base station apparatus 10A individually transmits the data titled "COMMON X" to corresponding in-vehicle apparatus 40 and receives, from the in-vehicle apparatus 40, a response indicating that the data titled "COMMON X" is received.

Thus, the base station apparatus according to the first embodiment of the present invention can perform communications with an in-vehicle apparatus reliably and smoothly without iteration.

Figure 1B:
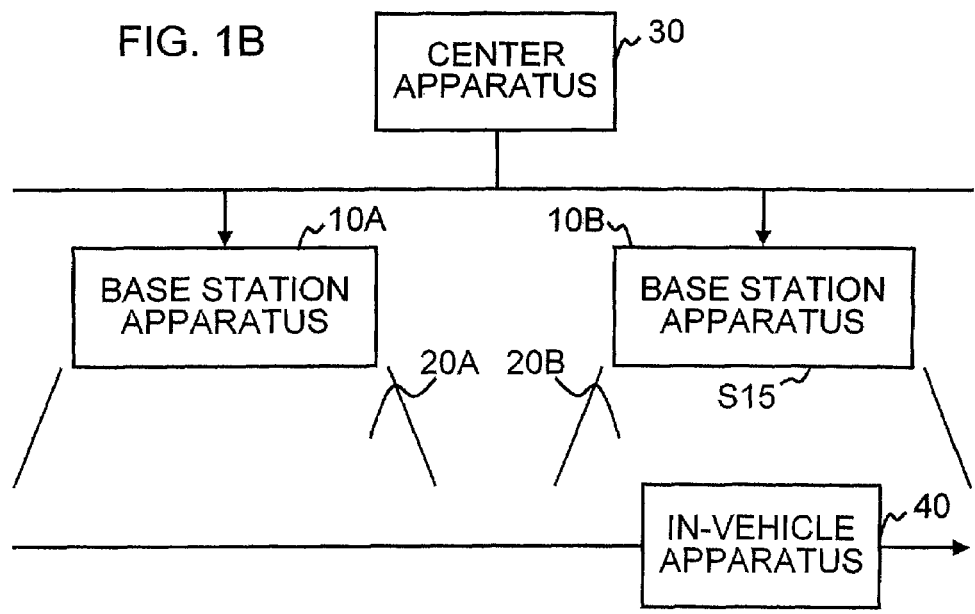

That is, as shown in FIGS. 1A and 1B, when common data is distributed to a plurality of base station apparatuses from a center apparatus and is individually apprised to in-vehicle apparatuses, the base station apparatus according to the first embodiment of the present invention does not transmit the common data to an in-vehicle apparatus that has been already apprised of the common data. For example, when data titled "COMMON X" is individually apprised from a plurality of base station apparatuses, the base station apparatuses (e.g., a base station apparatus 10A and a base station apparatus 10B) receive the data from the center apparatus 30 (step S11). The base station apparatus 10A individually transmits the data to in-vehicle apparatuses (e.g., an in-vehicle apparatus 40) within a zone 20A managed by the base station apparatus 10A (step S12), and receives a response to the data from the in-vehicle apparatus 40 (step S13). Further, the base station apparatus 10A transmits to the base station apparatus 10B apprise status data of the data titled "COMMON X" to the in-vehicle apparatus 40. For example, the base station apparatus 10A transmits a signal indicating that an entry including "01" and the "COMMON X" should include "APPRISED" (step S14).

Thereafter, even if the in-vehicle apparatus 40 moves to a zone 20B, the base station apparatus 10B does not transmit the data titled "COMMON X" to the in-vehicle apparatus 40 because the base station apparatus 10B has received the signal indicating that the in-vehicle apparatus 40 has received the data titled "COMMON X" (step S15). As a consequence, the in-vehicle apparatus 40 does not iteratively receive data that has already been received.

Figure 2A:
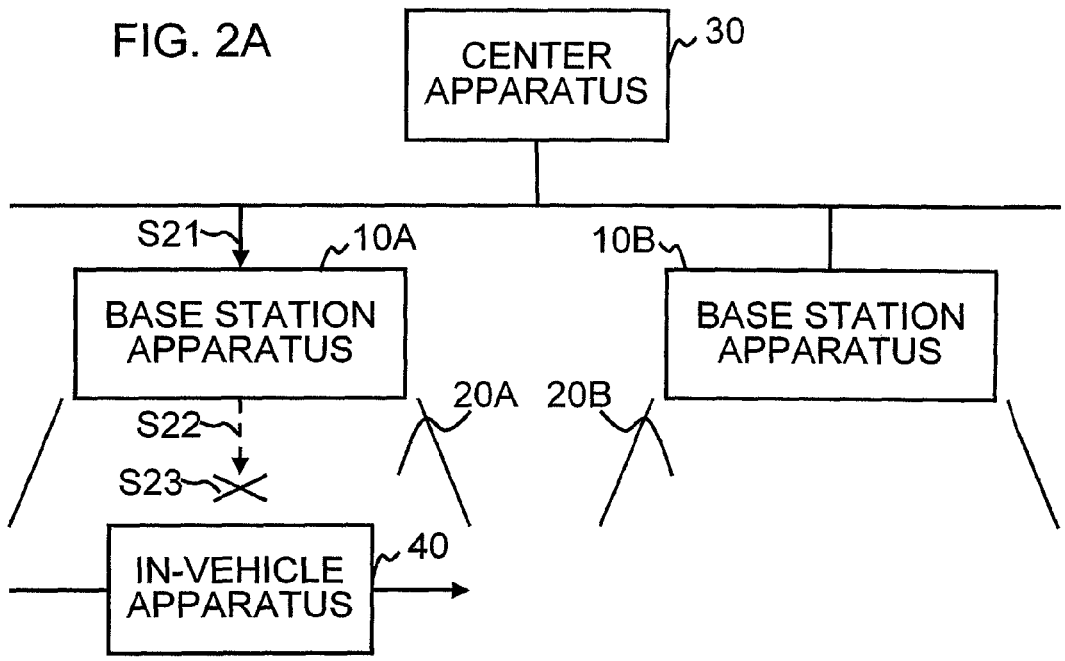
Figure 2B:
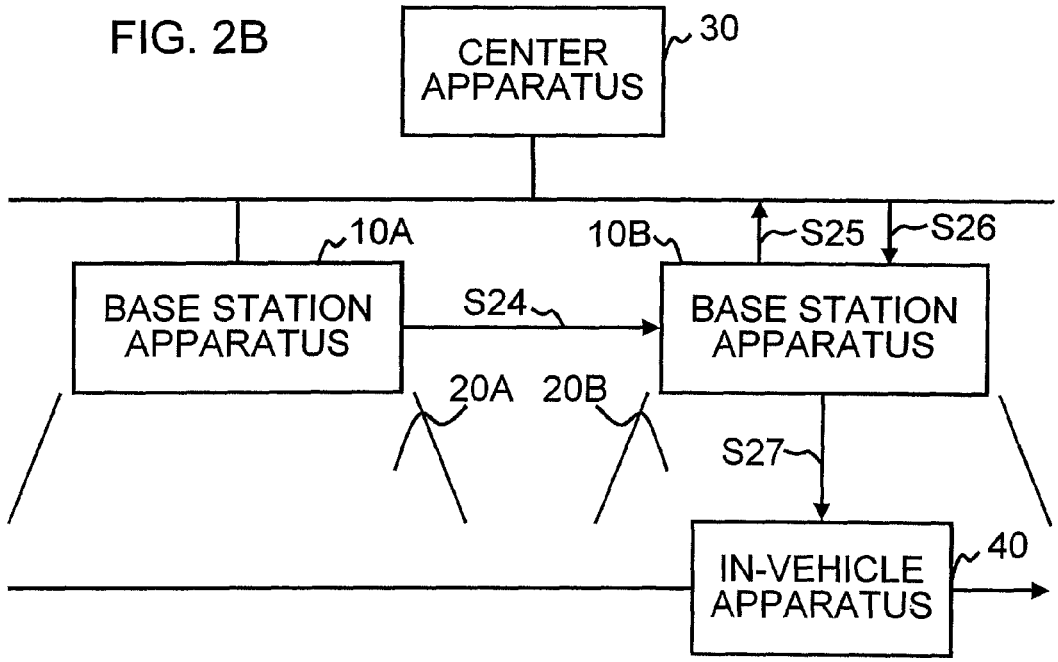

As shown in FIGS. 2A and 2B, when common data is individually distributed to a base station apparatus from a center apparatus and is individually apprised to in-vehicle apparatuses, the base station apparatus according to the first embodiment of the present invention reliably transmits the common data to the in-vehicle apparatuses. For example, when data titled "COMMON X" is individually apprised from only a specific base station apparatus (e.g., a base station apparatus 10A), the base station apparatus 10A according to the first embodiment of the present invention receives the data for a zone 20A from a center apparatus (step S21), and individually transmits the data to in-vehicle apparatuses (e.g., an in-vehicle apparatus 40) within the zone 20A (step S22).

Herein, when the in-vehicle apparatus 40 does not receive the data titled "COMMON X" from the base station apparatus 10A due to a radio disturbance or the like (step S23), the base station apparatus 10A transmits to other base station apparatuses (e.g., a base station apparatus 10B) apprise status data to the in-vehicle apparatus 40. For example, the base station apparatus 10B receives a signal indicating that an entry including "01" and the "COMMON X" should include "UNAPPRISED" (step S24). Thereafter, when the in-vehicle apparatus 40 moves to a zone 20B, the base station apparatus 10B detects that the data titled "COMMON X" is unapprised to the in-vehicle apparatus 40, and requests the data to a center apparatus (step S25). Upon receiving the data from the center apparatus (step S26), the base station apparatus 10B individually apprises the in-vehicle apparatus 40 of the data (step S27). As a consequence, the data titled "COMMON X" is reliably apprised to the in-vehicle apparatus 40.

As shown in FIGS. 3A and 3B, when demanded data is individually apprised to an in-vehicle apparatus, a base station apparatus according to the first embodiment of the present invention may transmit the demanded data via another base station apparatus. For example, upon receiving a demand for data titled "DEMANDED Y" from an in-vehicle apparatus 40 (step S31), a base station apparatus 10A requests the data to a center apparatus (step S32). Then, only the base station apparatus 10A receives the data (step S33).

If the in-vehicle apparatus 40 moves to a zone 20B from a zone 20A during this, the base station apparatus 10A transmits to other base station apparatuses (e.g., a base station apparatus 10B) apprise status data to the in-vehicle apparatus 40. For example, the base station apparatus 10B receives a signal indicating that an entry including "01" and "DEMANDED Y" should include "UNAPPRISED" (step S34). The base station apparatus 10B detects that the apprise of the data to the in-vehicle apparatus 40 failed, and requests the data to the center apparatus 30 without receiving from the in-vehicle apparatus 40 a signal indicating that the data titled "DEMANDED Y" is demanded (step S35). Upon receiving the data from the center apparatus (step S36), the base station apparatus 10B individually apprises the in-vehicle apparatus 40 of the data titled "DEMANDED Y" (step S37). As a consequence, even when the base station apparatus 10A has failed to apprise the in-vehicle apparatus 40 of demanded data, the in-vehicle apparatus 40 can receive the demanded data from the base station apparatus 10B without demanding to the base station apparatus 10B.

As described above, the base station apparatus according to the first embodiment of the present invention can perform communications with an in-vehicle apparatus reliably and smoothly without iteration. That is, the in-vehicle apparatus can reliably receive data without iteratively receiving the data that has been already received, and even when one base station apparatus fails to apprise the data, the in-vehicle apparatus can receive the data via another base station apparatus without iteratively demanding the data.

Figure 4:
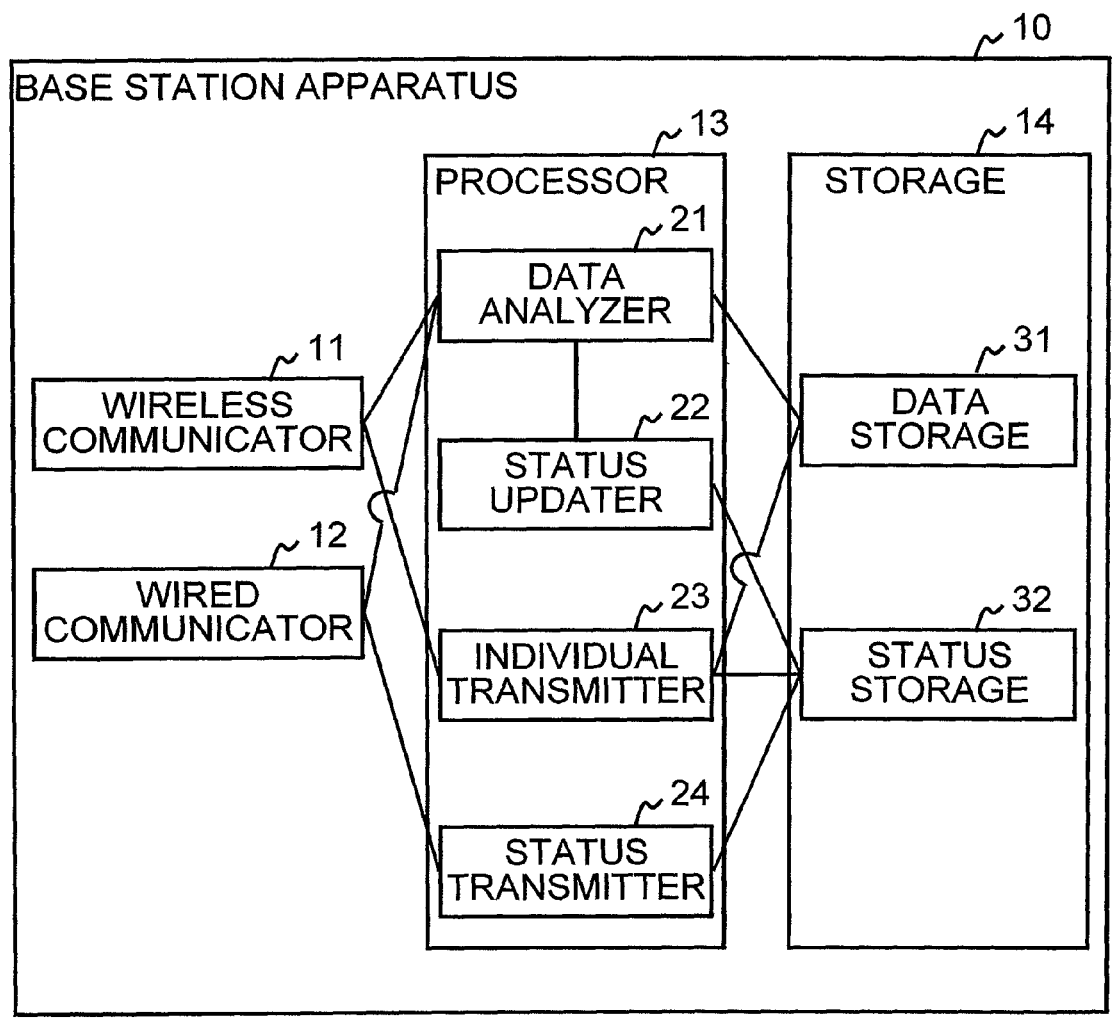
FIG. 4 is a block diagram illustrating a configuration of the base station apparatus according to the first embodiment of the present invention.

FIG. 4 is a block diagram illustrating a configuration of the base station apparatus according to the first embodiment of the present invention. A description will be given on the configuration of the base station apparatus shown in FIGS. 1A to 3B with reference to FIG. 4. As shown in FIG. 4, a base station apparatus 10 includes a wireless communicator 11, a wired communicator 12, a processor 13, and a storage 14.

The wireless communicator 11 performs wireless communications with in-vehicle apparatuses within a zone managed by the base station apparatus 10. Specifically, the wireless communicator 11 includes a wireless antenna, and transmits data to an in-vehicle apparatus and receives a response to the data from the in-vehicle apparatus.

The wired communicator 12 performs wired communications with other base station apparatuses and a center apparatus. Specifically, the wired communicator 12 includes a plurality of input/output ports, and receives from and transmits to other base station apparatuses apprise status data of data to an in-vehicle apparatus. The wired communicator 12 also receives and transmits common data and demanded data from/to the center apparatus.

The storage 14 stores data necessary for various processing performed by the processor 13. Specifically, as shown in FIG. 4, the storage 14 includes a data storage 31 and a status storage 32.

The data storage 31 is a memory that is temporarily used so as to efficiently perform data processing. Specifically, the data storage 31 stores data (e.g., data titled "COMMON X") to be transmitted to in-vehicle apparatuses.

The status storage 32 stores apprise status data of certain data to each in-vehicle apparatus within a zone managed by a base station apparatus 10 and other zones managed by other base station apparatuses. Specifically, the status storage 32 stores an apparatus table which includes data on in-vehicle apparatuses within the zone managed by the base station apparatus 10, and a common table which includes data on in-vehicle apparatuses within zones of all base station apparatuses. Both tables may include a plurality of entries. Each entry includes an in-vehicle apparatus ID (e.g., "01") associated with a data title (e.g., "COMMON X") of the data to be apprised and apprise status data (e.g., "UNAPPRISED") of the data. A status updater 22, which will be described later, updates both tables.

The processor 13 has an internal memory for storing a program that prescribes various processing sequences and control data. Various processing are executed in accordance with the program and the control data. The processor 13 includes a data analyzer 21, a status updater 22, an individual transmitter 23, and a status transmitter 24.

The data analyzer 21 analyzes received data. Specifically, the data analyzer 21 receives a demand for data or a response to the data from an in-vehicle apparatus via the wireless communicator 11. Further, the data analyzer 21 receives update data of the status storage 32 from another base station apparatus via the wired communicator 12. Furthermore, the data analyzer 21 receives data from the center apparatus via the wired communicator 12. The processing in the data analyzer 21 will be described later in detail.

The status updater 22 updates apprise status data stored in the status storage 32 in accordance with a status of apprise to an in-vehicle apparatus within a zone managed by the base station apparatus 10 and/or apprise status data received from another base station apparatus. Specifically, the status updater 22 updates the status storage 32 in accordance with a status of apprise of the data to be transmitted to an in-vehicle apparatus within a zone managed by the base station apparatus 10 or update data of the status storage 32 received from another base station apparatus 10. The processing in the status updater 22 will be described later in detail.

The individual transmitter 23 individually transmits unapprised data to an in-vehicle apparatus within a zone managed by the base station apparatus 10 by referring to apprise status data stored in the status storage 32. Specifically, the individual transmitter 23 individually apprises unapprised data to a pertinent in-vehicle apparatus by referring to apprise status data stored in the status storage 32 via the wireless communicator 11. Further, the individual transmitter 23 requests the unapprised data to a center apparatus via the wired communicator 12. The processing in the individual transmitter 23 will be described later in detail.

The status transmitter 24 transmits, to other base station apparatuses, apprise status data stored in the status storage 32. Specifically, when the status updater 22 updates apprise status data stored in the status storage 32, the status transmitter 24 transmits update data of the status storage 32 to other base station apparatuses via the wired communicator 12. The processing in the status transmitter 24 will be described later in detail.

Next, a description will be given on a processing flow of the base station apparatus according to the first embodiment of the present invention with reference to FIGS. 5 to 14C. Specifically, a description will be sequentially given on processing when an in-vehicle apparatus enters a zone managed by the base station apparatus, processing upon receiving common data, processing upon receiving update data of a status storage, processing upon receiving a demand for data, and processing in individual apprise.

Figure 5:
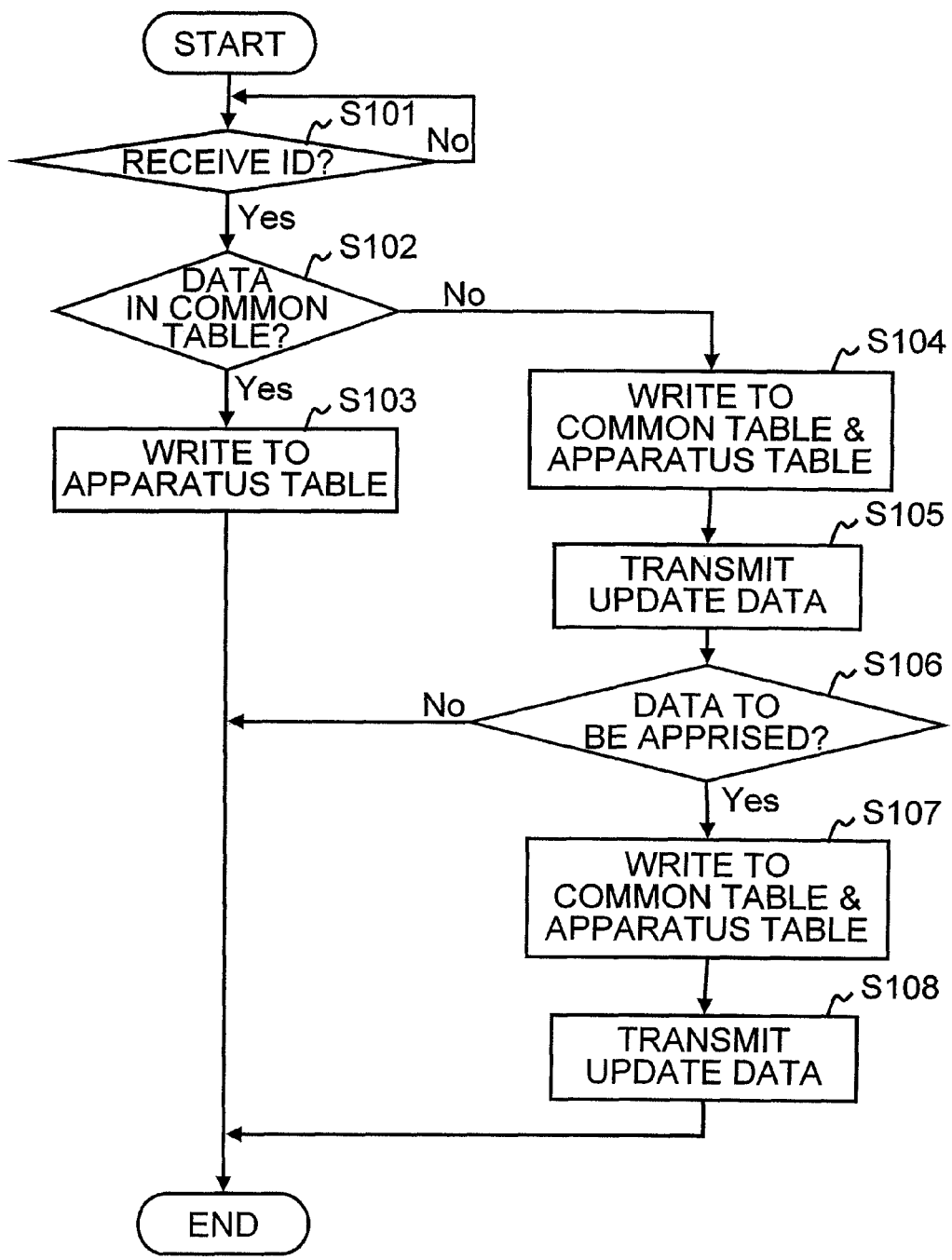
FIG. 5 is a flowchart illustrating a processing flow of the base station apparatus according to the first embodiment of the present invention when an in-vehicle apparatus enters a zone managed by the base station apparatus.

FIG. 5 is a flowchart illustrating a processing flow of the base station apparatus according to the first embodiment of the present invention when an in-vehicle apparatus enters a zone managed by the base station apparatus. FIGS. 6A to 6E are diagrams for illustrating processing of a status updater of the base station apparatus according to the first embodiment of the present invention when the in-vehicle apparatus enters the zone managed by the base station apparatus. A description will be given on a processing flow of the base station apparatus according to the first embodiment of the present invention when an in-vehicle apparatus enters a zone managed by the base station apparatus with reference to FIGS. 5 to 6E.

As shown in FIG. 5, the base station apparatus 10 transmits a signal to specify an in-vehicle apparatus to all the in-vehicle apparatuses within a zone managed by the base station apparatus 10 via the wireless communicator 11. Upon receiving an in-vehicle apparatus ID from an in-vehicle apparatus that has entered the zone and that has received the signal (Yes in step S101), the base station apparatus 10 searches for data on the pertinent in-vehicle apparatus in the status storage 32 (step S102). Specifically, when the data analyzer 21 has received an in-vehicle apparatus ID (e.g., "01"), the status updater 22 searches for an entry including the in-vehicle apparatus ID in the common table stored in the status storage 32.

When an entry on the pertinent in-vehicle apparatus exists in the status storage 32 (Yes in step S102), the status updater 22 reads the entry from the common table, and writes the entry to an apparatus table stored in the status storage 32 (step S103). The base station apparatus 10 ends processing of the case where an in-vehicle apparatus enters the zone managed by the base station apparatus 10, and waits for reception of an in-vehicle apparatus ID from another in-vehicle apparatus again (step S101). For example, when there is a pertinent in-vehicle apparatus ID (e.g., "01") in the common table (refer to FIG. 6A), that is, when the in-vehicle apparatus enters the zone managed by the base station apparatus 10 from a zone managed by another base station apparatus, the status updater 22 reads an entry including the in-vehicle apparatus ID (e.g., "01"), a data title (e.g., "COMMON X"), and apprise status data (e.g., "unapprised") from the common table, and writes the entry to the apparatus table (refer to FIG. 6B).

On the other hand, when there is no entry on the pertinent in-vehicle apparatus in the status storage 32 (No in step S102), the status updater 22 writes a new entry including the in-vehicle apparatus ID to the common table and the apparatus table stored in the status storage 32 (step S104). For example, when the in-vehicle apparatus ID (e.g., "01") does not exist in the common table (refer to FIG. 6C), that is, when the in-vehicle apparatus enters from an area outside of zones managed by the base station apparatuses, the status updater 22 creates a new entry including the in-vehicle apparatus ID (e.g., "01") and writes the entry to the common table and the apparatus table stored in the status storage 32 (refer to FIG. 6D).

The status transmitter 24 transmits update data of the common table to other base station apparatuses (step S105). Specifically, upon creating a new entry (e.g., an entry including "01") in the common table stored in the status storage 32, the status transmitter 24 transmits the in-vehicle apparatus ID (e.g., "01") to other base station apparatuses.

The status updater 22 searches for data to be apprised in the data storage 31 (step S106). Specifically, the status updater 22 searches for data (such as data titled "COMMON X") stored in the data storage 31, which is to be apprised to in-vehicle apparatuses (e.g., the in-vehicle apparatus 40) entering the zone managed by the base station apparatus 10.

If there is no data to be apprised in the data storage 31 (No in step S106), the base station apparatus 10 ends processing of the case where an in-vehicle apparatus enters the zone managed by the base station apparatus 10, and waits for reception of an in-vehicle apparatus ID from another in-vehicle apparatus again (step S101).

On the other hand, if there is any data to be apprised in the data storage 31 (Yes in step S106), the status updater 22 writes a title of the data to be apprised and apprise status data to the common table and the apparatus table stored in the status storage 32 (step S107). Specifically, if there is data (e.g., data titled "COMMON X") to be apprised to in-vehicle apparatuses (e.g., the in-vehicle apparatus 40) entering the zone managed by the base station apparatus 10 in the data storage 31, the status updater 22 writes "COMMON X" and "UNAPPRISED" as the data title and the apprise status data, respectively, to the entry including "01" of the common table and the apparatus table (refer to FIG. 6E).

The status transmitter 24 transmits update data of the common table to other base station apparatuses (step S108). Specifically, when "COMMON X" and "UNAPPRISED" are written as the data title and the apprise status data, respectively, to the entry of the common table stored in the status storage 32, the status transmitter 24 transmits the in-vehicle apparatus ID "01", the data title "COMMON X", and the apprise status data "UNAPPRISED" for data titled "COMMON X" to other base station apparatuses. The base station apparatus 10 ends processing of the case where an in-vehicle apparatus enters the zone managed by the base station apparatus 10, and waits for reception of an in-vehicle apparatus ID from another in-vehicle apparatus again (step S101).

Figure 7:
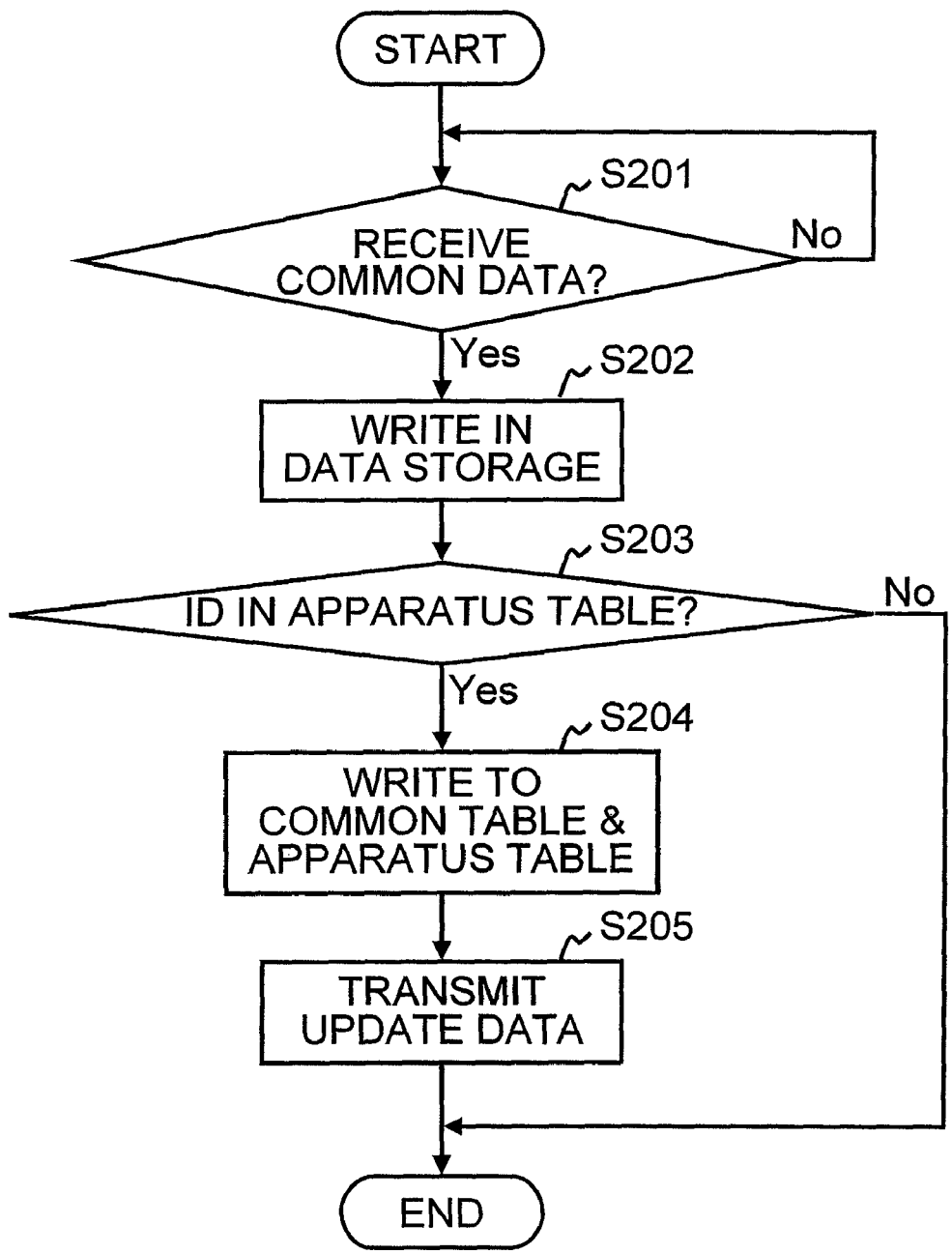
FIG. 7 is a flowchart illustrating a processing flow of the base station apparatus according to the first embodiment of the present invention upon receiving common data.

FIG. 7 is a flowchart illustrating a processing flow of the base station apparatus according to the first embodiment of the present invention upon receiving common data. FIGS. 8A and 8B are diagrams for illustrating processing of the status updater of the base station apparatus according to the first embodiment of the present invention upon receiving the common data. A description will be given on a processing flow of the base station apparatus according to the first embodiment of the present invention upon receiving the common data with reference to FIGS. 7 to 8B.

As shown in FIG. 7, upon receiving new common data from the center apparatus (Yes in step S201), the base station apparatus 10 writes the common data in the data storage 31 (step S202), and searches for an in-vehicle apparatus ID in the apparatus table (step S203). Specifically, upon receiving new common data (e.g., data titled "COMMON X") from the center apparatus, the data analyzer 21 writes the common data in the data storage 31. The status updater 22 then searches for an in-vehicle apparatus ID (e.g., "01") in the apparatus table stored in the status storage 32 so as to determine whether there is any entry.

If there is no in-vehicle apparatus ID in the apparatus table (No in step S203), the base station apparatus 10 ends the processing upon receiving the common data, and waits for reception of common data from the center apparatus again (step S201). Specifically, if the status updater 22 has determined that there is no entry by searching for in-vehicle apparatus ID (e.g., "01") in the apparatus table stored in the status storage 32, that is, if there is no in-vehicle apparatus within the zone managed by the base station apparatus 10, the base station apparatus 10 ends the processing upon receiving the common data.

On the other hand, if there is an in-vehicle apparatus ID in the apparatus table (Yes in step S203), the status updater 22 writes a data title of the new common data and apprise status data to an entry, of the common table and the apparatus table, corresponding to the in-vehicle apparatus ID (step S204). For example, if there is an in-vehicle apparatus ID "01" in the apparatus table (refer to FIG. 8A), that is, if there is the in-vehicle apparatus 40 within the zone managed by the base station apparatus, the status updater 22 writes the data title of the new common data (e.g., "COMMON X") to the entry corresponding to the in-vehicle apparatus ID, and further writes "UNAPPRISED" as the apprise status data corresponding to the data title (refer to FIG. 8B).

Subsequently, the status transmitter 24 transmits update data of the common table to other base station apparatuses (step S205). The base station apparatus 10 ends processing upon receiving new common data from the center apparatus, and waits for reception of common data from the center apparatus again (step S201). Specifically, when a data title "COMMON X" and apprise status data "UNAPPRISED" have been written to the common table stored in the status storage 32, the status transmitter 24 transmits, to other base station apparatuses, the in-vehicle apparatus ID (e.g., "01"), "COMMON X", and "UNAPPRISED".

Figure 9:
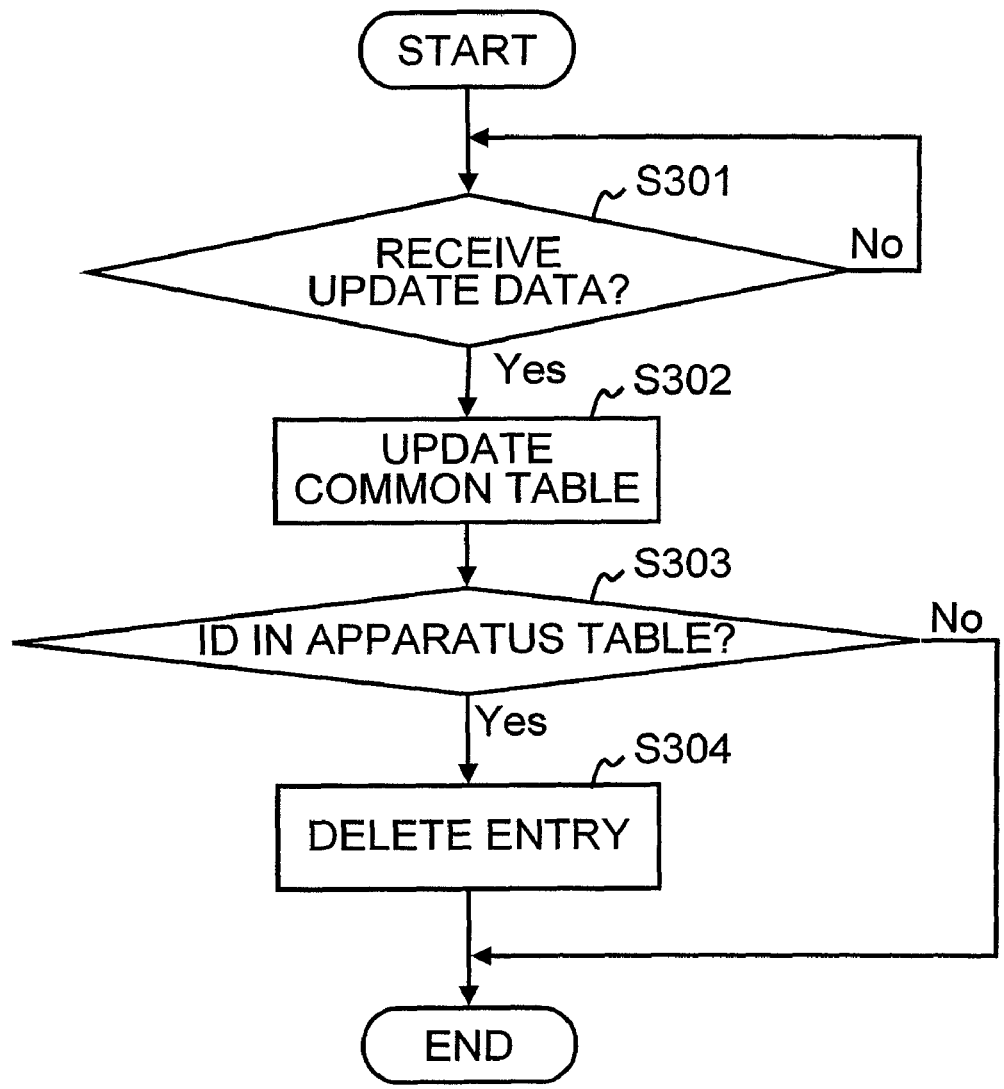
FIG. 9 is a flowchart illustrating a processing flow of the base station apparatus according to the first embodiment of the present invention upon receiving update data of a status storage.

FIG. 9 is a flowchart illustrating a processing flow of the base station apparatus according to the first embodiment of the present invention upon receiving update data of a status storage. FIGS. 10A to 10D are diagrams for illustrating processing of the status updater of the base station apparatus according to the first embodiment of the present invention upon receiving the update data of the status storage. A description will be given on a processing flow of the base station apparatus according to the first embodiment of the present invention upon receiving update data of the status storage with reference to FIGS. 9 to 10D.

As shown in FIG. 9, upon receiving update data of the common table from another base station apparatus (Yes in step S301), the base station apparatus 10 updates the common table (step S302), and searches, in the apparatus table, for an entry including the same in-vehicle apparatus ID (step S303). For example, when the data analyzer 21 has received an in-vehicle apparatus ID (e.g., "01") associated with "COMMON X" and "APPRISED" from another base station apparatus (refer to FIG. 10A), the status updater 22 updates the apprise status data in the entry, of the common table, including "01" and the "COMMON X" from "UNAPPRISED" to "APPRISED" (refer to FIGS. 10B and 10C) and determines whether there is an entry including "01" in the apparatus table.

If there is no entry, in the apparatus table, including the same in-vehicle apparatus ID (No in step S303), the base station apparatus 10 ends processing upon receiving update data of the status storage from another base station apparatus, and waits for update data of the common table from another base station apparatus again (step S301). Specifically, if there is no entry, in the apparatus table, including the same in-vehicle apparatus ID, that is, when an in-vehicle apparatus moves from a zone managed by one base station apparatus to a zone managed by another base station apparatus, yet another base station apparatus updates the common table without updating the apparatus table, and ends the processing upon receiving update data of the status storage from another base station apparatus.

On the other hand, if there is an entry including the same in-vehicle apparatus ID (Yes in step S303), the status updater 22 deletes the entry, of the apparatus table, including the same in-vehicle apparatus ID (step S304). The base station apparatus 10 ends the processing upon receiving update data of the common table from another base station apparatus, and waits for reception of update data of the common table from another base station apparatus again (step S301). For example, when the updated entry of the common table includes an in-vehicle apparatus ID "01" and the apparatus table includes an entry having the in-vehicle apparatus ID "01" (refer to FIG. 10C), that is, when the in-vehicle apparatus 40 moves from a zone managed by one base station apparatus to a zone managed by another base station apparatus, the entry including the in-vehicle apparatus ID "01" of the apparatus table of the one base station apparatus is deleted (refer to FIG. 10D).

Figure 11:
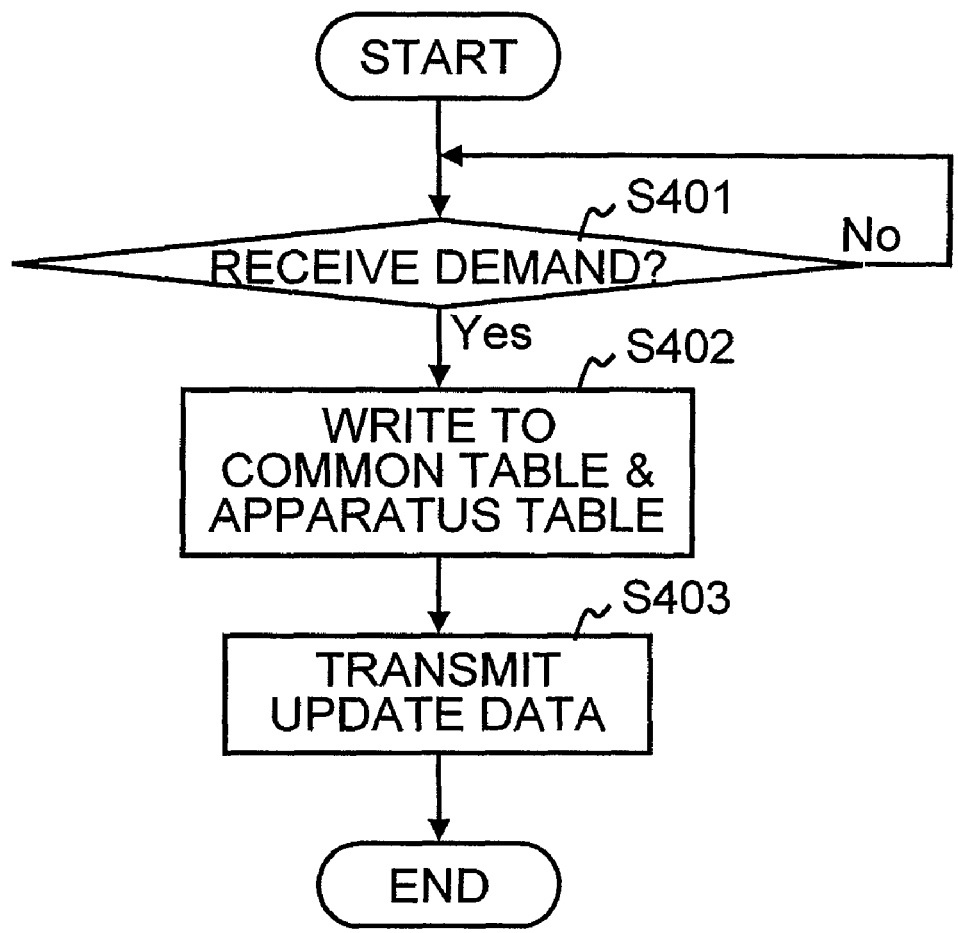
FIG. 11 is a flowchart illustrating a processing flow of the base station apparatus according to the first embodiment of the present invention upon receiving a demand for data.

FIG. 11 is a flowchart illustrating a processing flow of the base station apparatus according to the first embodiment of the present invention upon receiving a demand for data. FIGS. 12A and 12B are diagrams for illustrating processing of the status updater of the base station apparatus according to the first embodiment of the present invention upon receiving the demand for data. A description will be given on a processing flow of the base station apparatus according to the first embodiment of the present invention upon receiving the demand for data with reference to FIGS. 11 to 12B.

As shown in FIG. 11, upon receiving a demand for data from an in-vehicle apparatus (Yes in step S401), the base station apparatus 10 writes a data title and apprise status data to the common table and the apparatus table (step S402). For example, when the data analyzer 21 has received a demand for data titled "DEMANDED Y" from the in-vehicle apparatus 40, the status updater 22 writes a data title "DEMANDED Y" and apprise status data "UNAPPRISED" to an entry including the in-vehicle apparatus ID "01" of the common table and the apparatus table (refer to FIGS. 12A and 12B).

Subsequently, the status transmitter 24 transmits update data of the common table to other base station apparatuses (step S403). The base station apparatus 10 ends the processing upon receiving demand for data, and waits for demand for data from an in-vehicle apparatus again (step S401). For example, when a data title "DEMANDED Y" and apprise status data "UNAPPRISED" are written to the common table stored in the status storage 32, the status transmitter 24 transmits the in-vehicle apparatus ID "01", the data title "DEMANDED Y", and the apprise status data "UNAPPRISED" for the data titled "DEMANDED Y" to other base station apparatuses.

Figure 13:
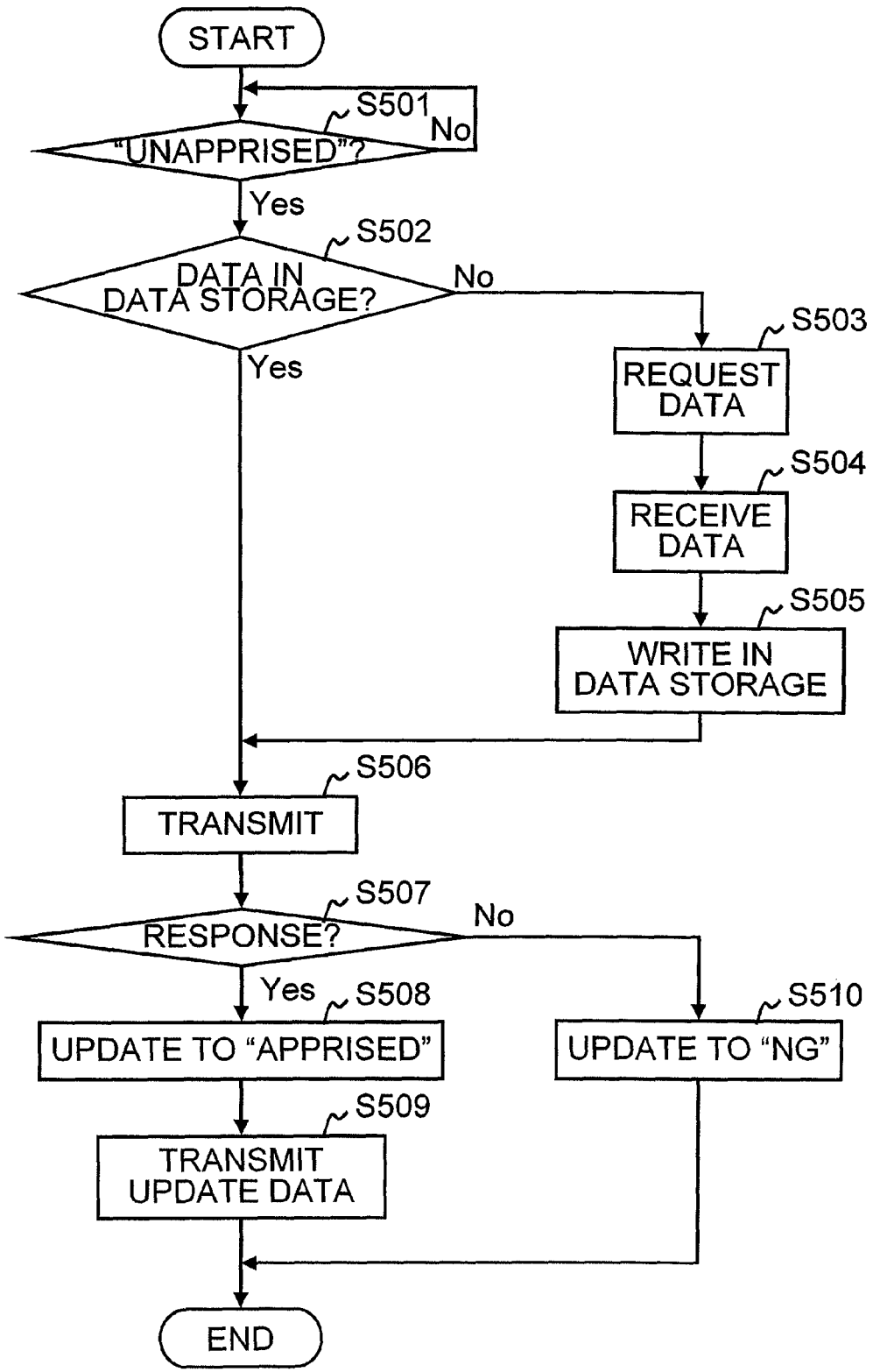
FIG. 13 is a flowchart illustrating a processing flow of the base station apparatus according to the first embodiment of the present invention in individual apprise.

FIG. 13 is a flowchart illustrating a processing flow of the base station apparatus according to the first embodiment of the present invention in individual apprise. FIGS. 14A to 14C are diagrams for illustrating processing of the status updater of the base station apparatus according to the first embodiment of the present invention in individual apprise. A description will be given on a processing flow in individual apprise performed by the base station apparatus according to the first embodiment of the present invention with reference to FIGS. 13 to 14C.

As shown in FIG. 13, if there is unapprised data in the apparatus table (Yes in step S501), the base station apparatus 10 searches for the data in the data storage 31 (step S502). For example, the individual transmitter 23 monitors the apparatus table and, if there is an entry including "UNAPPRISED" (e.g., the entry including "01", "COMMON X", and "UNAPPRISED" in FIG. 14A) in the apparatus table, determines whether there is pertinent data (e.g., data titled "COMMON X") in the data storage 31.

If the unapprised data is stored in the data storage 31 (Yes in step S502), the individual transmitter 23 reads the data from the data storage 31, and transmits the data (step S506). For example, when the data titled "COMMON X" is stored in the data storage 31 and the data titled "COMMON X" is unapprised to the in-vehicle apparatus 40 that enters the zone managed by the base station apparatus 10, the individual transmitter 23 reads the data titled "COMMON X" from the data storage 31 by referring to the status storage 32 and transmits the data titled "COMMON X" only to the in-vehicle apparatus 40.

On the other hand, if the unapprised data is not stored in the data storage 31 (No in step S502), the individual transmitter 23 requests the data to the center apparatus (step S503). For example, when the data titled "COMMON X" is unapprised to the in-vehicle apparatus 40 that enters the zone managed by the base station apparatus 10 and the data titled "COMMON X" is not stored in the data storage 31, the individual transmitter 23 requests the data titled "COMMON X" to the center apparatus.

Subsequently, upon receiving the unapprised data from the center apparatus (step S504), the data analyzer 21 writes the data in the data storage 31 (step S505). For example, upon receiving the data titled "COMMON X" from the center apparatus, the data analyzer 21 writes the data in the data storage 31.

Subsequently, the individual transmitter 23 reads the unapprised data from the data storage 31, and transmits the data (step S506). For example, the individual transmitter 23 reads the data titled "COMMON X" from the data storage 31 by referring to the status storage 32, and transmits the data to the in-vehicle apparatus (e.g., the in-vehicle apparatus 40) that is unapprised of the data.

Herein, if there is a response from the in-vehicle apparatus after ending the above processing (Yes in step S507), the status updater 22 updates the apprise status data of the unapprised data in the common table and the apparatus table to "APPRISED" (step S508). For example, if the data analyzer 21 receives a response to the data titled "COMMON X" from the in-vehicle apparatus 40 after transmitting the data to the in-vehicle apparatus 40, the status updater 22 updates the apprise status data in the entry, of the common table and the apparatus table, including the in-vehicle apparatus ID "01" and "COMMON X" from "UNAPPRISED" to "APPRISED" (refer to FIGS. 14A and 14B).

Subsequently, the status transmitter 24 transmits the update data of the common table to other base station apparatuses (step S509). The base station apparatus 10 ends the processing of individual apprise, and monitors the apparatus table again (step S501). For example, when apprise status data in an entry of the common table stored in the status storage 32, including the in-vehicle apparatus ID "01" and "COMMON X" has been updated from "UNAPPRISED" to "APPRISED", the status transmitter 24 transmits, to other base station apparatuses, the in-vehicle apparatus ID "01", the data title "COMMON X", and the apprise status data "APPRISED" of the data titled "COMMON X".

On the other hand, if there is no response from the in-vehicle apparatus after ending the transmission (No in step S507), the status updater 22 updates, the apprise status data, in the apparatus table, of the unapprised data to "UNAPPRISED" (step S510). The base station apparatus 10 ends the processing of individual apprise, and monitors the apparatus table again (step S501). For example, if there is no response to the data titled "COMMON X" from the in-vehicle apparatus 40 after the data is transmitted to the in-vehicle apparatus 40 and a certain amount of time (e.g., 1 minute) passes, the status updater 22 updates the apprise status data in the entry, of the apparatus table, including the in-vehicle apparatus ID "01" and the "COMMON X" from "UNAPPRISED" to "NG" indicating an unsuccessful apprise (refer to FIGS. 14A and 14C).

Thus, the base station apparatus 10 according to the first embodiment of the present invention stores apprise status dataes of certain data to every in-vehicle apparatuses within a zone managed by the base station apparatus 10 and other zones managed by other base station apparatuses, transmits the apprise status dataes stored in the status storage to other base station apparatuses, updates apprise status data stored in the status storage in accordance with a status of apprise to an in-vehicle apparatus within the zone managed by the base station apparatus 10 and/or apprise status data received from another base station apparatus, transmits unapprised data to an in-vehicle apparatus within the zone managed by the base station apparatus 10 by referring to apprise status data stored in the status storage, in response to such occasions of the time when an in-vehicle apparatus enters a zone managed by a base station apparatus, the time when common data is received, the time when update data of the status storage is received, the time when a demand for data is received, and the time of individual apprise.

That is, in the base station apparatus 10, the status updater 22 updates the status storage 32 in accordance with the apprise status data to an in-vehicle apparatus within a zone managed by the base station apparatus 10, and the individual transmitter 23 individually transmits data by referring to the status storage 32. Further, the status transmitter 24 transmits update data of the status storage 32 to other base station apparatuses, and shares the apprise status dataes to in-vehicle apparatuses with the other base station apparatuses.

As mentioned above, according to the first embodiment of the present invention, the base station apparatus 10 stores apprise status dataes of certain data to every in-vehicle apparatuses within a zone managed by the base station apparatus 10 and other zones managed by other base station apparatuses, transmits the apprise status dataes stored in the status storage to other base station apparatuses, updates apprise status data stored in the status storage in accordance with a status of apprise to an in-vehicle apparatus within the zone managed by the base station apparatus 10 and/or apprise status data received from another base station apparatus, transmits unapprised data to an in-vehicle apparatus within the zone managed by the base station apparatus 10 by referring to apprise status data stored in the status storage. Accordingly, the base station apparatus can perform communications with an in-vehicle apparatus reliably and smoothly without iteration. That is, the in-vehicle apparatus can reliably receive data without iteratively receiving the data that has been already received, and even when a base station apparatus fails to apprise the data, the in-vehicle apparatus can receive the data via another base station apparatus.

Further, according to the first embodiment, when the base station apparatus 10 has not received, from the center apparatus, data to be apprised, the base station apparatus 10 requests distribution of the data to the center apparatus. Upon receiving the data, the base station apparatus 10 transmits the data to an in-vehicle apparatus within a zone managed by the base station apparatus 10. Therefore, the base station apparatus 10 can reliably transmit, to an in-vehicle apparatus, data of which another base station apparatus has failed to apprise to the in-vehicle apparatus when the in-vehicle apparatus passed through the zone managed by the another base station apparatus.

Other Embodiments

In addition to the first embodiment according to the present invention mentioned above, the present invention can be variously embodied. Hereinafter, other embodiments of the present invention will be described.

According to the first embodiment, the description is given on the case of transmitting data to an in-vehicle apparatus which is a wireless communication apparatus mounted on a vehicle. However, the present invention is not limited to this, and can be applied to the case of transmitting data to an in-vehicle apparatus such as a mobile phone or a PHS (Personal Handy phone System).

According to the first embodiment, when the base station apparatus 10 has not received, from the center apparatus, data to be apprised, the base station apparatus 10 requests distribution of the data to the center apparatus. Upon receiving the data, the base station apparatus 10 transmits the data to an in-vehicle apparatus within a zone managed by the base station apparatus 10. However, the present invention is not limited to this and the unapprised data may be requested to the center apparatus and transmitted to the in-vehicle apparatus only when the data still needs to be apprised. That is, if there is data that is unapprised to an in-vehicle apparatus and the data is not necessary for the in-vehicle apparatus (e.g., data on a traffic jam that has been already solved or local data of a passed through area), the data may not be transmitted.

According to the first embodiment, the description is given on the case of transmitting update data to other base station apparatuses when the status storage is updated. However, the present invention is not limited to this, and the data stored in the status storage may be transmitted in a lump (e.g., a set of data including updated data on an in-vehicle apparatus with ID "01" and data on an in-vehicle apparatus with ID "02", which is not updated).

According to the first embodiment, the description is given on the case of transmitting update data to other base station apparatuses when the status storage is updated. However, the present invention is not limited to this and the update data may be transmitted at regular time intervals (e.g., every 5 min).

According to the first embodiment, the description is given on the case of updating the apprise status data to "NG" when a certain amount of time has passed after the data was transmitted. However, the present invention is not limited to this, and the apprise status data may be updated to "NG" after a certain times (e.g., three times) of repeated trials for apprise of the same data.

According to the first embodiment, the description is given on the case where the common table includes apprise status data of certain data to an in-vehicle apparatus within a zone managed by another base station apparatus. However, the present invention is not limited to this, and the apprise status data of certain data to only the in-vehicle apparatuses within the zone managed by the base station apparatus itself may be stored. That is, the in-vehicle apparatus within the zone managed by the base station apparatus itself may be distinguished by setting a flag to the in-vehicle apparatus ID thereof in the common table and the apprise status data thereof may be stored. Moreover, the apprise status data to only the in-vehicle apparatuses within the zone managed by the base station apparatus itself may be stored and apprise status data to an in-vehicle apparatus entering the zone managed by the base station apparatus itself may be demanded to other base station apparatuses. That is, data on in-vehicle apparatuses may be shared with other base station apparatuses, while storing apprise status dataes of data only to the in-vehicle apparatuses within the zone managed by the base station apparatus itself.

In addition, according to the first embodiment, the description is given on individual apprise in which the individual transmitter requests unapprised data to the center apparatus when the data storage does not have the data, and upon receiving the data, the data analyzer writes the data in the data storage (refer to steps S502 to S505 in FIG. 13). However, the present invention is not limited to this, and the individual transmitter may independently request the unapprised data to the center apparatus. That is, the individual transmitter may search for unapprised data on the basis of the apparatus table and the data storage. For example, the data may be individually apprised on the basis of the apparatus table and the data storage. Alternatively, this processing may be performed as another processing, similarly to the processing when the in-vehicle apparatus enters the zone managed by the base station apparatus.

It is possible to arbitrarily change the data (e.g., the stored data shown in FIGS. 6A to 6E, FIGS. 8A and 8B, FIGS. 10A to 10D, FIGS. 12A and 12B, or FIGS. 14A to 14C) including the processing sequences, control sequences, specific names, and various data and parameters shown in the specification and the drawings according to the first embodiment, unless otherwise specified.

The components of the apparatuses shown in the drawings are functionally conceptual and may not be physically configured as shown in the drawings. That is, examples of the disintegration and integration of the apparatuses are not limited to those shown in the drawings. All or a part of the examples can be physically or functionally disintegrated or integrated in accordance with various loads and using situations in arbitrary units (e.g., the data analyzer can be integrated to the status updater in FIG. 4). Moreover, all or an arbitrary part of the processing functions in the apparatuses can be realized by a CPU (central processing unit) and a program that is interpreted and executed by the CPU and, alternatively, can be realized by hardware based on wired logic.

Figure 15:
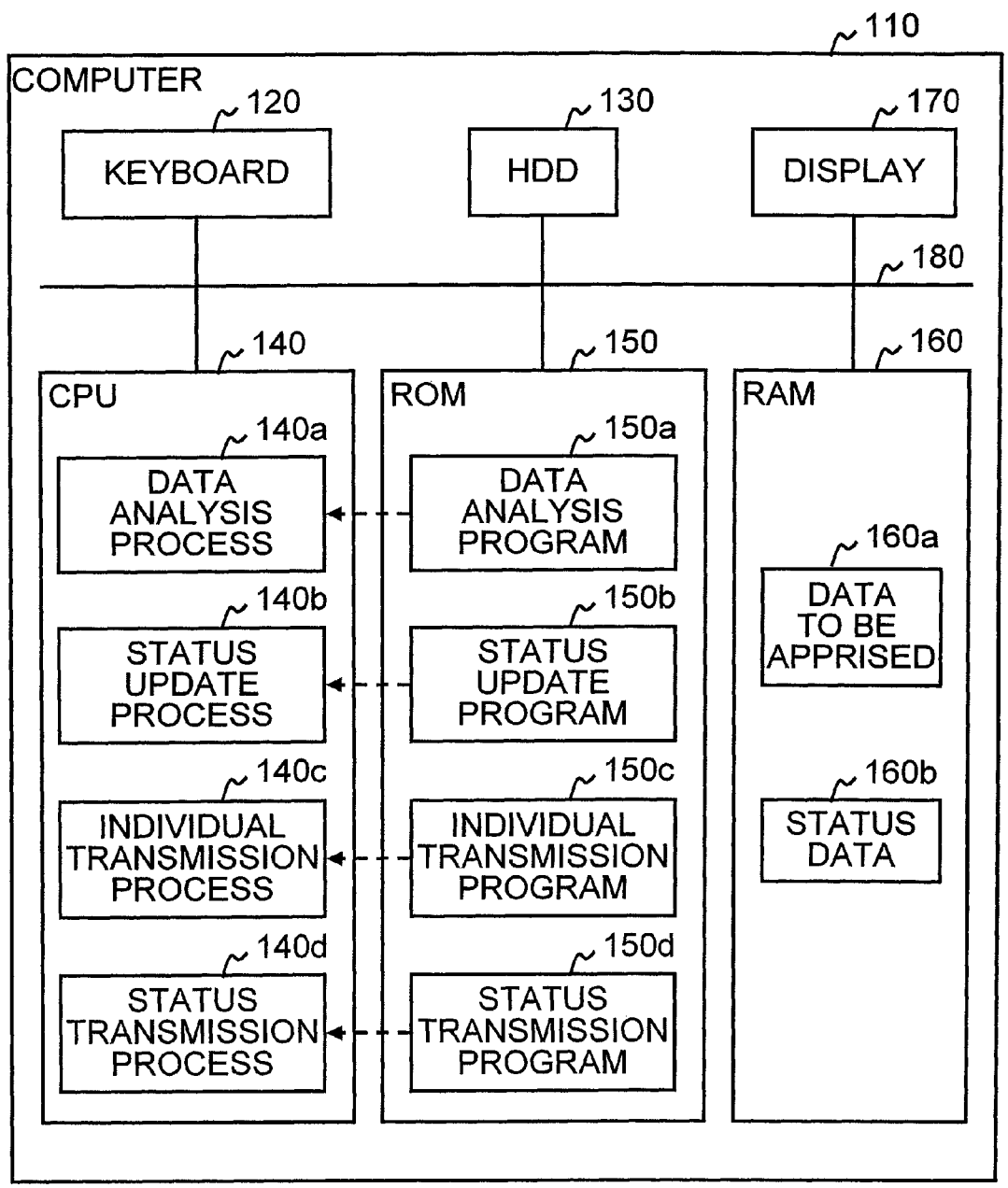
FIG. 15 is a diagram illustrating a computer that executes a communication program according to an embodiment of the present invention.
Figure 16A:
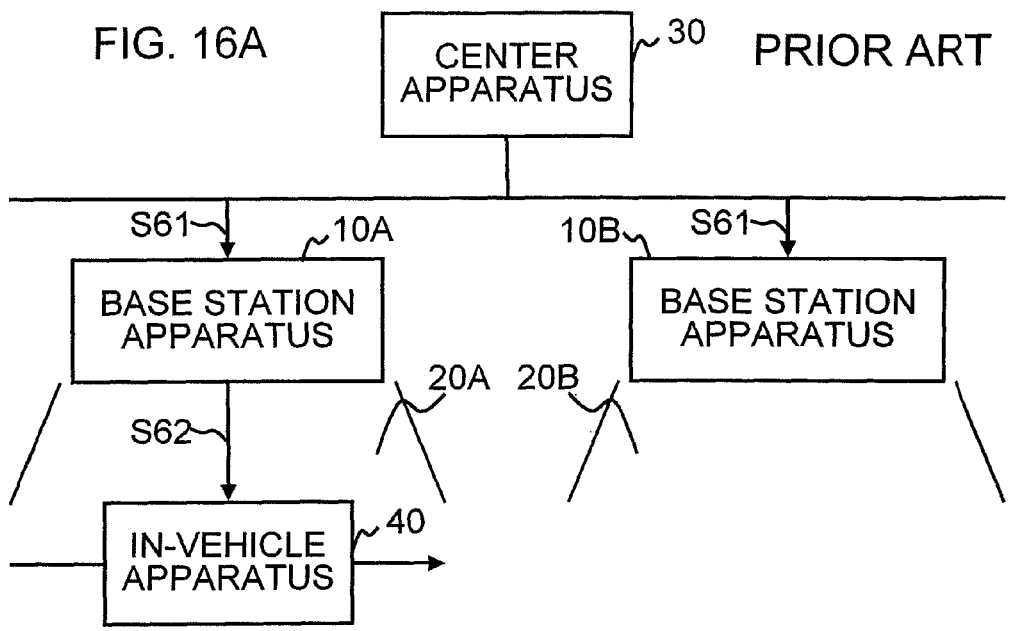
Figure 16B:
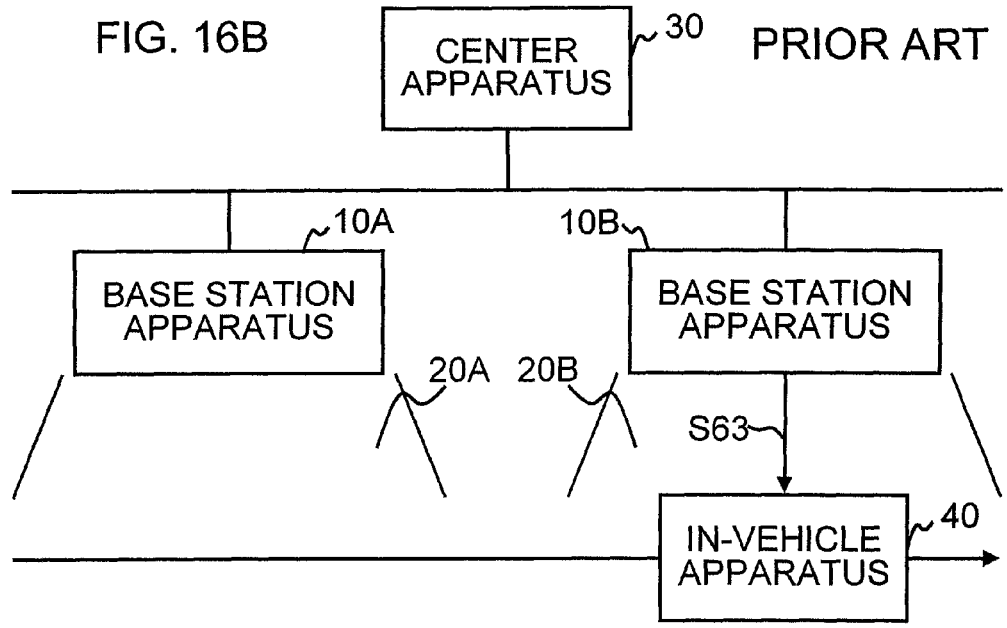
Figure 17A:
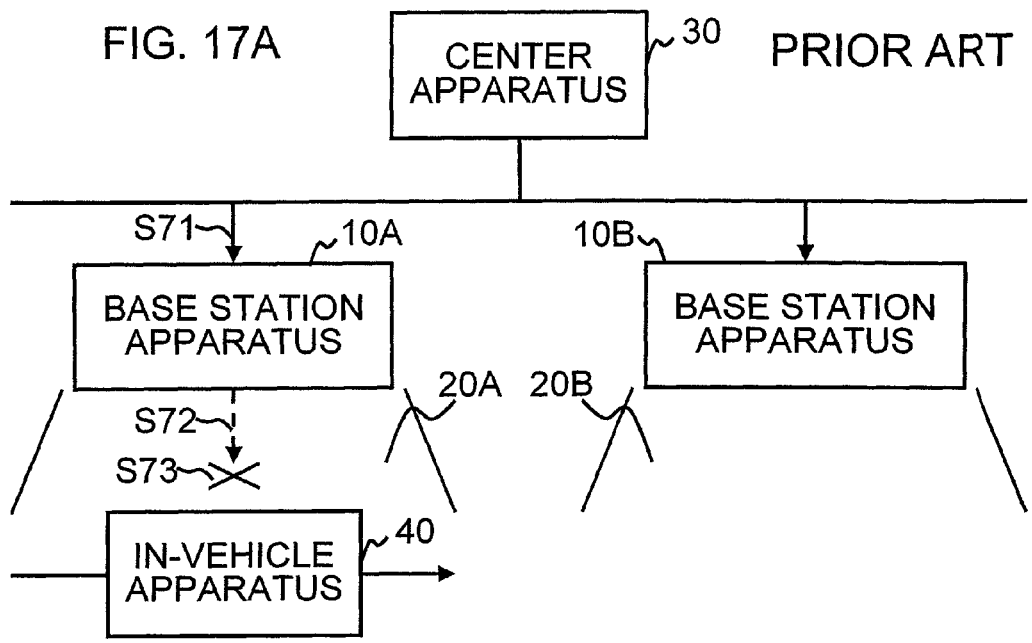
Figure 17B:
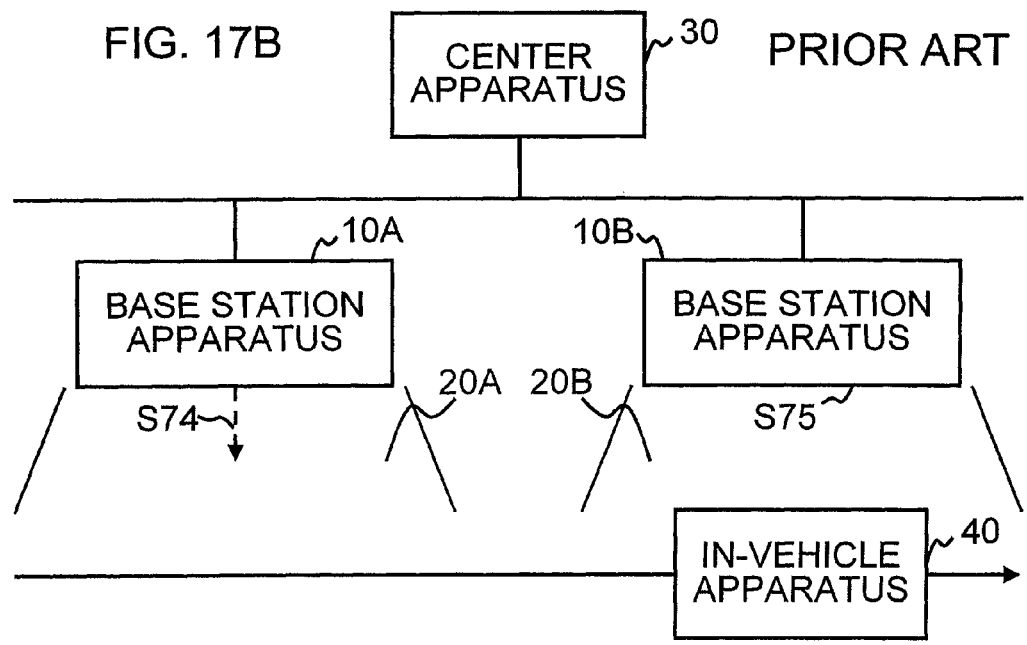

According to the embodiments, various processing is realized by the hardware logic. However, the present invention is not limited to this, and may be realized by executing a prepared program by a computer. FIG. 15 is a diagram illustrating a computer that executes a communication program according to an embodiment of the present invention. Hereinafter, a description will be given, with reference to FIG. 15, on an example of a computer that executes a communication program of a base station apparatus having the same functions as those of the base station apparatus 10 according to the first embodiment.

As shown in FIG. 15, a computer 110 as a base station apparatus includes a keyboard 120, an HDD (hard disk drive) 130, a CPU 140, a ROM (read-only memory) 150, a RAM (random access memory) 160, and a display 170 that are connected each other by a bus 180 or the like.

The ROM 150 stores beforehand a communication program including subprograms providing functions similar to those of the base station apparatus 10 according to the first embodiment, in other words, a data analysis program 150*a*, a status update program 150*b*, an individual transmission program 150*c*, and a status transmission program 150*d*, as shown in FIG. 15. These subprograms 150*a* to 150*d* may be properly integrated or disintegrated, similarly to the components in the base station apparatus shown in FIG. 4.

Then, the CPU 140 reads the subprograms 150*a* to 150*d* from the ROM 150 and executes the subprograms. As a consequence, the CPU 140 can function as a data analysis process 140*a*, a status update process 140*b*, an individual transmission process 140*c*, and a status transmission process 140*d*, as shown in FIG. 15. The processes 140*a* to 140*d* correspond to the data analyzer 21, the status updater 22, the individual transmitter 23, and the status transmitter 24 shown in FIG. 4, respectively.

Then, the CPU 140 executes the communication program of the base station apparatus on the basis of data to be apprised 160*a* and status data 160*b* stored in the RAM 160.

The subprograms 150*a* to 150*d* may not be stored in the ROM 150 from the beginning. The subprograms may be stored in a "portable physical medium", that are inserted into the computer 110, such as an FD (flexible disk), a CD-ROM (compact-disc read-only memory), a DVD (digital versatile disc), and an MO (magneto-optical) disc or an IC (integrated circuit) card, in a "fixed physical medium" such as an HDD disposed outside/inside the computer 110, or in "another computer (or server)" connected to the computer 110 via a public line, Internet, LAN (local area network), or WAN (wide area network), and the computer 110 may read and execute the program.

As mentioned above, the base station apparatus according to the present invention is useful in transmitting data to an in-vehicle apparatus within a zone managed by the base station apparatus. In particular, the base station apparatus according to the present invention is suitable to perform communications with the in-vehicle apparatus reliably and smoothly without iteration.

What is claimed is:

1. A base station apparatus for transmitting center data received from a center apparatus to wireless communication apparatuses within a zone, said base station apparatus being capable of communicating with other base station apparatuses, said base station apparatus comprising:
    a data storage for storing the center data received from the center apparatus;
    a data receiver for receiving the center data from the center apparatus and storing the center data in the data storage;
    a status storage for storing apprise status data indicative of a status of apprise of certain center data to a wireless communication apparatus;
    a status receiver for receiving apprise status data transmitted from one of the other base station apparatuses;
    an updater for updating the apprise status data stored in the status storage in accordance with the apprise status data received from the one of the other base station apparatuses; and
    an individual transmitter for transmitting by referring to the apprise status data stored in the status storage the certain center data stored in the data storage to a wireless communication apparatus which is within the zone and unapprised of the certain center data.

2. The base station apparatus of claim 1, further comprising:
    a status transmitter for transmitting the apprise status data stored in the status storage to the other base station apparatuses,
    wherein
        when the status of apprise has been changed by transmission of the certain center data to a wireless communication apparatus within the zone, the updater updates the apprise status data stored in the status storage and the status transmitter transmits the updated apprise status data to the other base station apparatuses.

3. The base station apparatus of claim 1, wherein
    said individual transmitter requests, in the absence of the certain center data, the center apparatus for the certain center data, and transmits, on receiving the certain center data, the certain center data to the wireless communication apparatus which is within the zone and unapprised of the certain center data.

4. The base station apparatus of claim 1, wherein
    said individual transmitter transmits the certain center data to the wireless communication apparatus which is within the zone and unapprised of the certain center data when the base station apparatus has determined that the certain center data is still needed.

5. A communication method executed by a base station apparatus for transmitting center data received from a center apparatus to wireless communication apparatuses within a zone, said base station apparatus being capable of communicating with other base station apparatuses, said base station apparatus including a data storage for storing the center data received from the center apparatus, said base station apparatus including a status storage for storing apprise status data indicative of a status of apprise of certain center data to a wireless communication apparatus, the communication method comprising the steps of:
    receiving the center data from the center apparatus and storing the center data in the data storage;
    receiving apprise status data transmitted from one of the other base station apparatuses;
    updating the apprise status data stored in the status storage in accordance with the apprise status data received from the one of the other base station apparatuses; and
    transmitting by referring to the apprise status data stored in the status storage the certain center data stored in the data storage to a wireless communication apparatus within the zone and unapprised of the certain center data.

6. A computer readable storage medium storing a program of instructions to a computer for executing a communication method for transmitting center data received from a center apparatus to wireless communication apparatuses within a zone, said computer being capable of communicating with base station apparatuses, said computer including a data storage for storing the center data received from the center apparatus, said computer including a status storage for storing apprise status data indicative of a status of apprise of certain center data to a wireless communication apparatus, the communication method comprising the steps of:
    receiving the center data from the center apparatus and storing the center data in the data storage;
    receiving apprise status data transmitted from one of the base station apparatuses;
    updating the apprise status data stored in the status storage in accordance with the apprise status data received from the one of the base station apparatuses; and
    transmitting by referring to the apprise status data stored in the status storage the certain center data stored in the data storage to a wireless communication apparatus within the zone and unapprised of the certain center data.

* * * * *